United States Patent
Shear

(10) Patent No.: US 11,531,724 B2
(45) Date of Patent: Dec. 20, 2022

(54) ENTITY CENTRIC DATABASE

(71) Applicant: Dataparency, LLC, Novi, MI (US)

(72) Inventor: Timothy A. Shear, Novi, MI (US)

(73) Assignee: Dataparency, LLC, Novi, MI (US)

( * ) Notice: Subject to any disclaimer, the term of this patent is extended or adjusted under 35 U.S.C. 154(b) by 334 days.

(21) Appl. No.: 16/833,548

(22) Filed: Mar. 28, 2020

(65) Prior Publication Data

US 2021/0303644 A1    Sep. 30, 2021

(51) Int. Cl.
*G06F 16/93* (2019.01)
*G06F 16/958* (2019.01)

(52) U.S. Cl.
CPC ............ *G06F 16/958* (2019.01); *G06F 16/93* (2019.01)

(58) Field of Classification Search
CPC ................................ G06F 16/93; G06F 16/958
See application file for complete search history.

(56) References Cited

U.S. PATENT DOCUMENTS

| | | | |
|---|---|---|---|
| 8,793,768 B2 | 7/2014 | Beck | |
| 9,819,650 B2 | 11/2017 | Soon-Shiong et al. | |
| 10,007,895 B2* | 6/2018 | Vanasco | G06F 16/9024 |
| 10,460,841 B2 | 10/2019 | Korpman et al. | |
| 10,474,655 B1 | 11/2019 | Lewis | |
| 10,942,991 B1* | 3/2021 | Kidd | G06F 16/9574 |
| 2002/0116363 A1* | 8/2002 | Grainger | G06Q 10/109 |
| 2002/0161733 A1* | 10/2002 | Grainger | G06Q 50/184 |
| | | | 706/45 |
| 2004/0054627 A1* | 3/2004 | Rutledge | G06Q 10/087 |
| | | | 705/50 |
| 2007/0240203 A1 | 10/2007 | Beck | |
| 2011/0246462 A1* | 10/2011 | Wu | G06F 16/951 |
| | | | 707/E17.046 |
| 2013/0290821 A1* | 10/2013 | Pollack | G06F 16/9566 |
| | | | 715/208 |
| 2014/0304006 A1 | 10/2014 | Korpman et al. | |
| 2015/0169758 A1* | 6/2015 | Assom | G06F 16/36 |
| | | | 707/603 |
| 2015/0304400 A1* | 10/2015 | Spivack | G06F 16/36 |
| | | | 709/201 |

(Continued)

FOREIGN PATENT DOCUMENTS

| KR | 20150074376 A | 7/2015 |
|---|---|---|
| KR | 101545216 B1 | 8/2015 |
| WO | 2018201009 A1 | 11/2018 |

OTHER PUBLICATIONS

Anne C. van Rossum, "Visual Iconic Language A Framework for Visual Iconic Languages", pp. 1-16 (Year: 2006).*

(Continued)

*Primary Examiner* — Merilyn P Nguyen
(74) *Attorney, Agent, or Firm* — Endurance Law Group PLC

(57) ABSTRACT

A highly secure database platform is entity-centric and entity-controlled. Posting, query and retrieval of a data is bound to unique, unidirectional relationship identifiers that control a requesting entity's access to documents pertaining to a targeted entity. Data is immutably mapped to entities and relationships. The platform is domain-partitioned, schema-agnostic and order-preserving. The invention presents a trusted platform or service which is readily adapted to data concerning people, groups, businesses, devices, and/or microservices.

20 Claims, 12 Drawing Sheets

(56) References Cited

U.S. PATENT DOCUMENTS

| | | | |
|---|---|---|---|
| 2016/0055233 A1 | 2/2016 | Wang et al. | |
| 2016/0105402 A1 | 4/2016 | Soon-Shiong et al. | |
| 2016/0239579 A1* | 8/2016 | Zholudev | G06F 16/245 |
| 2018/0067932 A1 | 3/2018 | Paterson et al. | |
| 2018/0262493 A1 | 9/2018 | Andrade | |
| 2019/0037047 A1* | 1/2019 | Shribman | H04L 67/02 |
| 2019/0065683 A9 | 2/2019 | Korpman et al. | |
| 2020/0174630 A1* | 6/2020 | Rosenberg | G06F 3/013 |
| 2020/0176098 A1* | 6/2020 | Lucas | G16H 70/00 |
| 2020/0211409 A1* | 7/2020 | Latorre | H04L 9/0861 |
| 2022/0121884 A1* | 4/2022 | Zadeh | G06K 9/6264 |

OTHER PUBLICATIONS

Rossum. "Visual Iconic Language A Framework for Visual Iconic Languages". Article [online], Jun. 30, 2006; Delft University of Technology; Publication [online], Jun. 30, 2006 [retrieved May 23, 2021], Retrieved from the Internet: http://www.kbs.dtw.tudelft.nl/docs/MSc/2006/ACvanRossum/thesis.pdf; pp. 1-201.

Angin et al., "An Entity-centric Approach for Privacy and Identity Management in Cloud Computing", Purdue University Department of Computer Science, 2010 29th IEEE Symposium on Reliable Distributed Systems, Oct. 31-Nov. 3, 2010, https://www.cs.purdue.edu/homes/bb/SRDS.pdf.

Cudre-Mauroux, Phillipe, "Entity-Centric Data Management", eXascale Infolab, University of Fribourg Switzerland, MIT CSAIL—DB GROUPMar. 29, 2012.

Floss, Sara, "New Relic One: Why Be Entity-Centric?", May 14, 2019, https://blog.newrelic.com/product-news/new-relic-one-entity-centric/.

Moore, Dave, "Your Data Model Should be Entity-Centric—You Just Don't Know it Yet", Sep. 27, 2016, http://web.archive.org/web/20170620103255/https:/www.novetta.com/2016/09/data-model-entity-centric-just-dont-know-yet/.

* cited by examiner

Domain / Class / Aspect or Collection Topologies

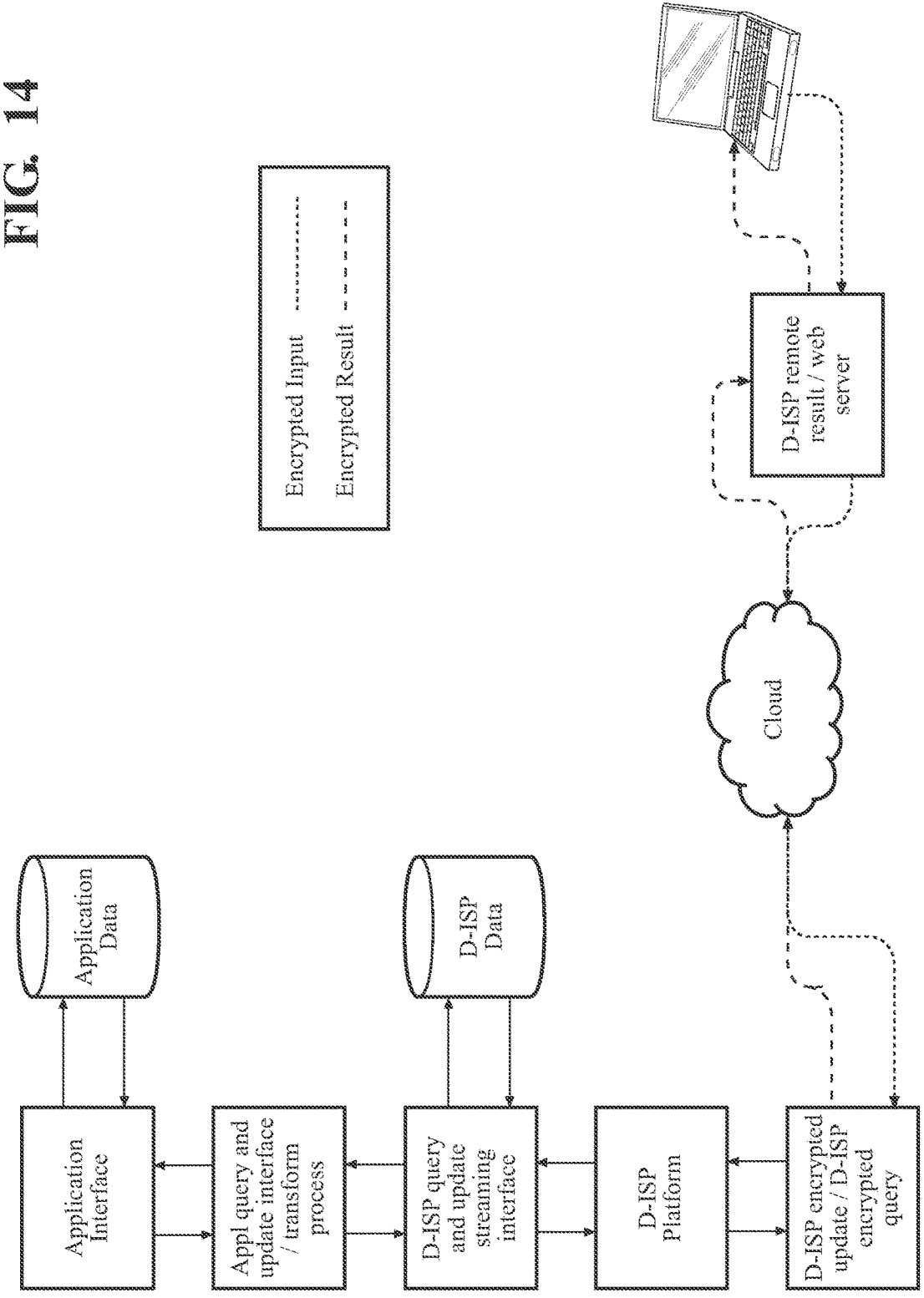

ENTITY CENTRIC DATABASE

BACKGROUND OF THE INVENTION

Field of the Invention

The invention relates generally to data storage and processing by a digital computer, particularly to database systems on a shared cloud platform, and more particularly to methods of ensuring data security without compromising efficiency.

Description of Related Art

Many efforts have been made to defend against hacking and security breaches of computer databases without sacrificing convenience and functionality. Efforts have focused on enhancing security measures to defeat hackers, such as robust credential verification and data encryption, but databases remain vulnerable to persistent and prolonged efforts to obtain data behind the security barriers. The approach of the prior art is analogous to erecting taller, thicker walls around the castle to defeat attempted breaches.

The problem takes on a new dimension as technology moves to the Cloud platform model, which offers services through a network platform exposing access and service through the network to outside or external endpoints. Typical services supported by Cloud platforms are Database-as-a-Service (DaaS), Infrastructure-as-a-Service (IaaS), Platform-as-a-Service (PaaS), and many other 'as-a-Service' offerings. As access points to the platform proliferate, defending against attacks such as hacking and ransomware becomes more difficult, and layering additional security layers can result in inconvenience and inefficiency.

Meanwhile, the majority of databases are structured as "relational" databases which require schema, e.g. "last name" "birthdate" "blood type" to be arranged in tables of rows and columns. The query/retrieval language SQL (Structured Query Language) forms the basis of all relational database access. Such design and access restrictions can constrain the ability of real world entities to store data optimally. An example of one such database is U.S. Pat. No. 8,793,768 "Relationship-Based Authorization" (Beck). Beck uses rows and columns in a table to store relationships (e.g. '768 FIG. 4), and consults those relationships as part of a "front end" to control access to documents stored in an otherwise conventional database.

Newer database designs include nonrelational databases, increasingly known as "NoSQL" (Not only SQL) such as MongoDB, Couchbase, CouchDB, Marklogic, AWS DynamoDB, Microsoft Azure DB and other Key/Value database products wherein data components are not organized as tables, but as "keys" associated with "values." (Sometimes referred to as "tags" associated with "values."). Such database models are more conducive to the hierarchical mode of organizing familiar to humans, such as domain/class/entity/collection, e.g., FairviewHospital/patients/JohnSmith/testresults. However, databases such as MongoDB and CouchDB have their own shortcomings. For example, to speed up queries these databases require a priori definition of fields to index. This requires stored data to conform to the indexing parameters. Documents that do not have the field in the index specification will not be included in indexed queries. In other words, databases built using MongoDB and CouchDB are schema-specific.

There is a need for a database that provides a reduced attack surface and accessibility of the cloud, impregnable security, flexible and schema-agnostic access, and entity control over its data.

BRIEF SUMMARY OF THE INVENTION

Disclosed is an entity-centric, domain-partitionable, custodian-controlled database platform. Posting, query and retrieval of a data is bound to unique, unidirectional (one-way) "relationship identifiers" that identify the relationship access privileges between, for example, an entity requesting access to a document pertaining to a targeted entity. For example, if entity1 is a doctor and entity2 is a patient, the platform assigns a unique Relationship Distributed Identifier (RDID) the doctor would use when he posts a document pertaining to entity2's lab test result. Each component of information from every document ingested into the platform retains the RDID and entity information provided at the time the information was ingested. Therefore, the database presents as entity-centric, i.e., structured around entities and their relationships.

Access to the platform is generally through a network such as the internet or intranet preferably using hierarchical HTTP Uniform Resource Identifiers (URI). This allows domain-driven design for consistent and yet flexible data modeling of the enterprise's data. For example, the platform may be accessed by a standard REST Resource-oriented Application Program Interface (API) using familiar HTTP (or HTTPS) verbs GET and POST. Data queries can thus be a simple "path" definition in the API call. This allows expression of the RDID directly in the hierarchical path, e.g., domain/class/RDID/collection. Collections of like data elements are organized as "aspects" within the data hierarchy of the entity, including features such as demographics, events, readings, etc. As every field is addressable, the invention allows fast ad hoc queries because there is no need to specify indexing parameters.

The database is overseen by a trusted Data Custodian Platform. The Data Custodian Platform may be a local, entity-owned service, or a contracted service provided by a cloud provider. The Data Custodian Platform administers entity data, access and updating. The Data Custodian Platform accepts privacy rules from an entity which the platform uses in any access/update operation. These privacy rules may also be used to insulate sensitive data from queries submitted to the database, including queries submitted to the data platform's entity data store(s) (hereinafter "data store set" or simply "data store") and may further depend on the role of the requestor. This ensures transparency to the entity data while respecting the privacy context desired by the entity.

Data pertaining to an entity comprises resources or addressable values that are arranged in a hierarchical structure rooted at entity domain, many of which the entity may belong, preferably consistent with the real-world entity that is being represented. These resources are further arranged into groupings or sets of related resources called 'aspects' or collections. Additionally, aspects may be 'virtual' and/or 'compositional' where multiple physical or virtual aspects are combined into a named virtual aspect. A sample aspect could be 'demographics', i.e., the identifying characteristics of the entity. Again, FairviewHospital/patients/JohnSmith/testresults is an example. An example from the realm of devices and the Internet of Things might be companyx/temperature-sensors/thermo26/readings.

In summary, the invention presents a trusted platform or service which is domain partitionable, entity-bound, entity-relationship-centric, self-sovereign identity, order-preserving, immutable, schema-agnostic, and resource-oriented, and which can be used on cloud services, and which is readily adapted to data concerning people, groups, businesses, devices, and/or microservices. There is a largely unmet need for an infrastructure to manage data and privacy/security from an entity-centered platform. Industries that would benefit from such an infrastructure include the healthcare domain, customer management and relations (CRM), personal finance and banking, DLT (Distributed Ledger Technology) ledgers, military and defense, and governmental agencies such as Medicare/Medicaid.

BRIEF DESCRIPTION OF THE SEVERAL VIEWS OF THE DRAWINGS

These and other features and advantages of the present invention will become more readily appreciated when considered in connection with the following detailed description and appended drawings, wherein:

FIG. 14 shows another aspect of the invention directed to secure remote processing of data.

DETAILED DESCRIPTION OF THE INVENTION

By way of general reference, the text and attached figures refer to a Database System 10, Data Platform 12, Entities 11, Application Program Interface 14, Data Store 18, Client Library 24, Database Access Layer 26 and other references. Referring to the figures, wherein like numerals indicate like or corresponding parts throughout the several views, disclosed is a new method of managing data using Relationship Distributed Identifiers (RDIDs) and a domain-driven hierarchical design. The domain-driven design is generally hierarchical and in that respect comparable to traditional file management systems, e.g. "userXYZ/workfiles/customer88/sales_quotes.

Overview of System Components

Figure 1:
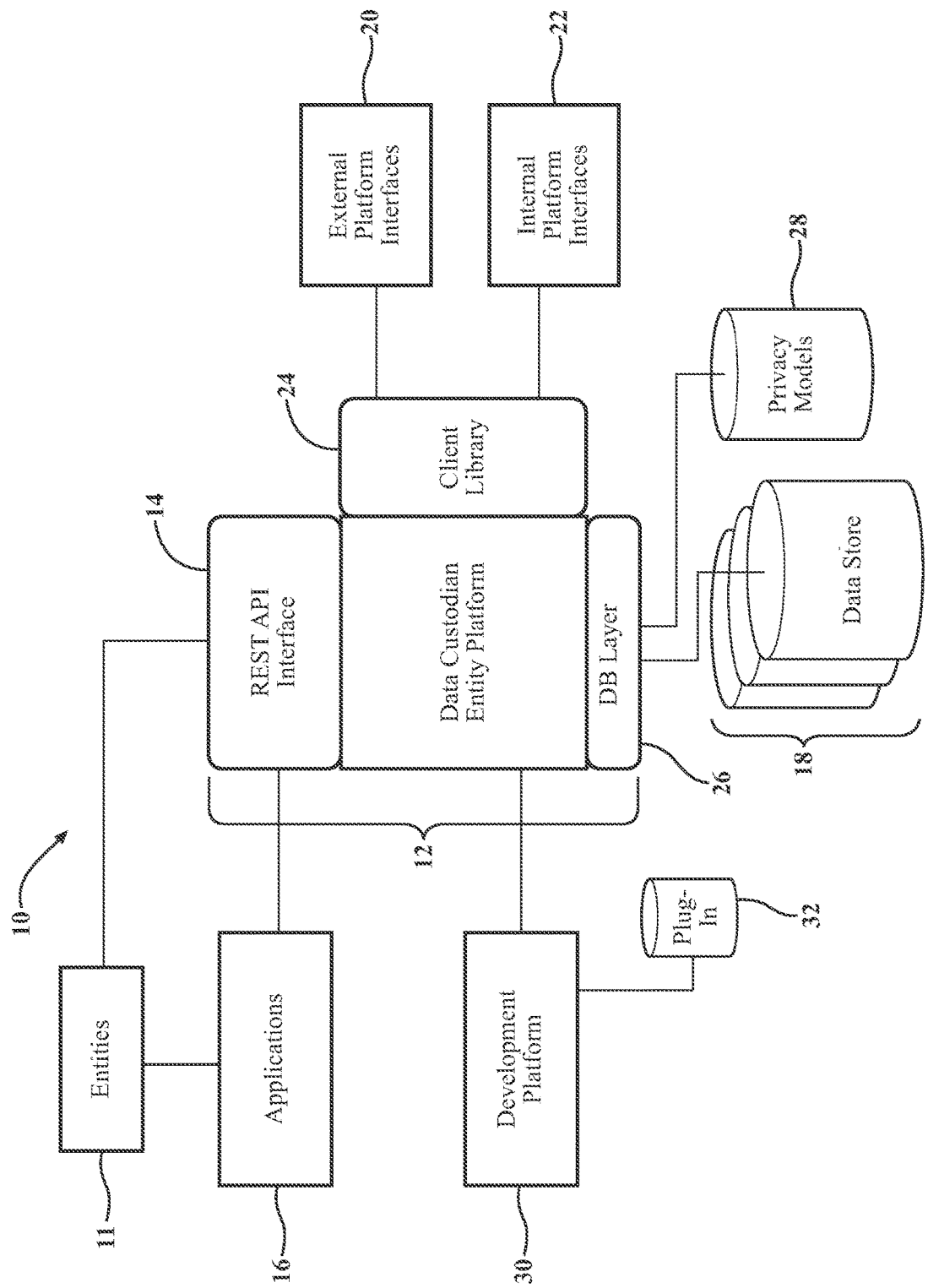
FIG. 1 is an overview of the platform components showing their interaction.
Figure 2:
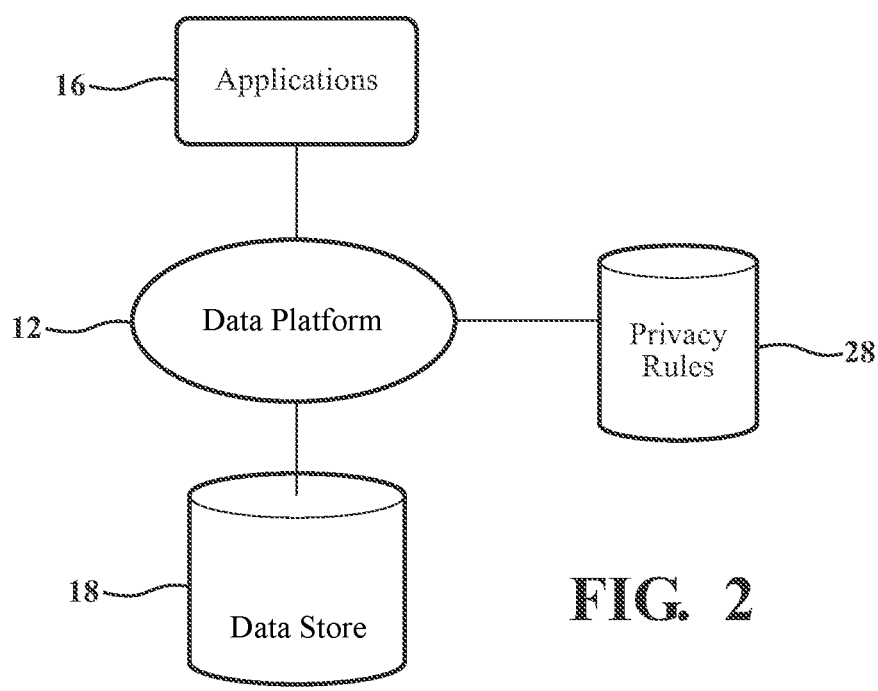
FIG. 2 is another view showing interaction between the Data Custodian Platform and constituent interfaces.
Figure 3:
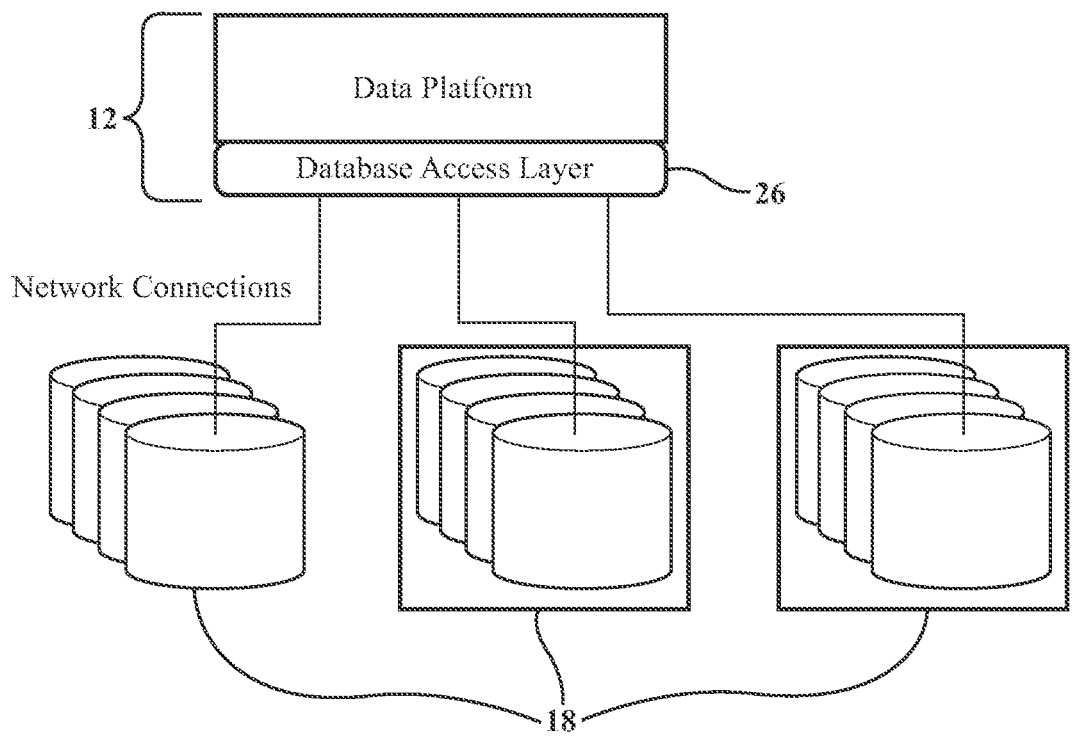
FIG. 3 is another view showing interaction of database components.

FIGS. 1, 2 and 3 show three representations of database system 10 comprising a Data Custodian Entity Platform (hereinafter "data platform" or simply "platform") 12. The data platform may be a local, entity-owned service, or a contracted service provided by a cloud provider. The data platform administers entity data, access and updating. Interacting with database system 10 are entities 11. Entity 11 may be a person (e.g. a patient, a customer), a business, a government agency, a device, a microservice, a group of any or all of the foregoing, a subgroup of one or more groups, and many other real-world objects, real or virtual.

Entity 11 may interact with data platform 12 using a REpresentational State Transfer (REST) resource-oriented Application Program Interface 14 (API) using familiar HTTP or HTTPS as the communication protocol. In one embodiment, entity users may use only the HTTP verbs GET and POST when interacting with data platform 12. Entities may also interact with data platform 12 using one or more third party applications 16. Examples of applications 16 that may be suitable in a given set of circumstances include a web browser, a user interface library, publish-subscribe systems (pub/sub) such as NATS 2.0, and task processors including microservice orchestrators such as Kubernetes. Applications 16 may comprise a messaging and task processing service, including where the application receives a communication from the platform concerning an event occurring in the platform, where the receipt of the communication occurs as a consequence of a subscription by the application to events triggered within the platform, where the triggered events are communicated to an external application via an external platform interface, where the application comprises a Business Process Management (BPM) framework, where the BPM framework is configured to query and offer data to an analytical application. Applications 16 may comprise one or more other analytical applications, such as a platform to accept analytical data, such as TIBCO Jaspersoft, or an analytical application that comprises an Artificial Intelligence (AI) platform, where the AI platform comprises a platform to accept data, such as Tensor, or an analytical application that is configured to recognize device readings, or where an analytical application comprises a platform to accept data such as Apple Healthkit, or where the analytical application comprises a platform to accept data such as Samsung SAMI, or where the analytical application comprises a platform to accept data such as Validic, or where the analytical application comprises an Internet of Things (IoT) framework, or where the analytical application comprises distributed ledger technology (DLT). The above applications are intended to be illustrative and representative of applications that may be suitably combined with database system 10; they are not meant to be limiting.

The data base system 10 includes one or more data stores 18 in which to store key value (KV) data concerning entities 11. The platform may be connected to a broad variety of external platform interfaces 20 that receive and/or react to events occurring on the platform. The platform may access data stores 18 locally or through a network connection. In the embodiment shown in FIG. 3, local connections are indicated by boxed data stores. At least one server may interface with any data store 18 through a procedure call, or may interface through a network interface layer. Those skilled in the art will appreciate that there are data stores other than true KV data stores that can store KV data. For purposes of the specification and the claims, "data store" includes both key value data stores and data stores that are compatible with KV data. Likewise, the platform may comprise one or more internal platform interfaces 22 that receive, respond, and/or generate internal data and instructions regarding the platform 12 data. The platform 12 may further comprise a client library 24 particularly to interface with external services. An example of a client library 24 is Microsoft Active Directory that may be useful for inputting users into the system.

Each data store 18 may be accessed externally through a database access layer 26. In a preferred embodiment, database access layer 26 is implemented as an API layer between the data store 18 and data platform 12. In another embodiment, DB access layer 26 may proxy calls to the data store(s) 18 through an internal library interface. Single entity read requests may be mapped to the next available master/mirror data store 18 assigned that Entity. Queries covering more than one entity may be broadcast to all data stores 18 in the available data store set. The DB access layer 26 may then aggregate all responses to return data to the platform. The system further comprises a privacy model 28 having privacy rules. The privacy model may be applied against data that is retrieved as a result of a query to restrict return of the results through DB access layer 26. Similarly, write requests may be broadcast to all data store sets 18 assigned to the Entity. The DB access layer 26 monitors the responses from all sets and only returns when a quorum of data store 18 responses has been received. This allows for consistency and allows read access from any one of the data stores 18 extant.

As shown in FIG. 1, the system may also comprise a meta-model development platform 30 useful for designing hierarchical domains adapted to database system 10, as well as entities and aspects. Development platform 30 may be built upon existing frameworks such as Eclipse, IntelliJ/Web Storm/GoLand, and others. Database system 10 may further comprise a meta-model plug-in 32 to incorporate meta-model development within other application development functionality. For example, meta-model plug-in 32 may, in cooperation with privacy model 28, devise features to control access to certain defined aspects of an entity's data. In one embodiment, development platform 30 and meta-model plug-in 32 may design and/or specify the aspects of documents within a class or among classes of documents, and as discussed further below may define member nodes or values conform to privacy model 28 to make some data unavailable for access. An exported privacy model 28 may become the source for entity privacy settings. Privacy settings and rules in privacy model 28 may include not only the data tags and/or values accessible for a given entity in the data store(s) 18, but also the conditions of endpoint roles by a user that are allowed access. Moreover, in addition to the primary entity privacy model 28, sub-entities can define and further limit access to their information, including imposing desired privacy rules tailored to individual relationships, such as "return results of query for return of my HIV test result only if requested by entity XYZ." These privacy rules may then be incorporated within the hierarchy of the entity data.

Background and Overview of Hierarchical Domain-Driven Design

Figure 12:
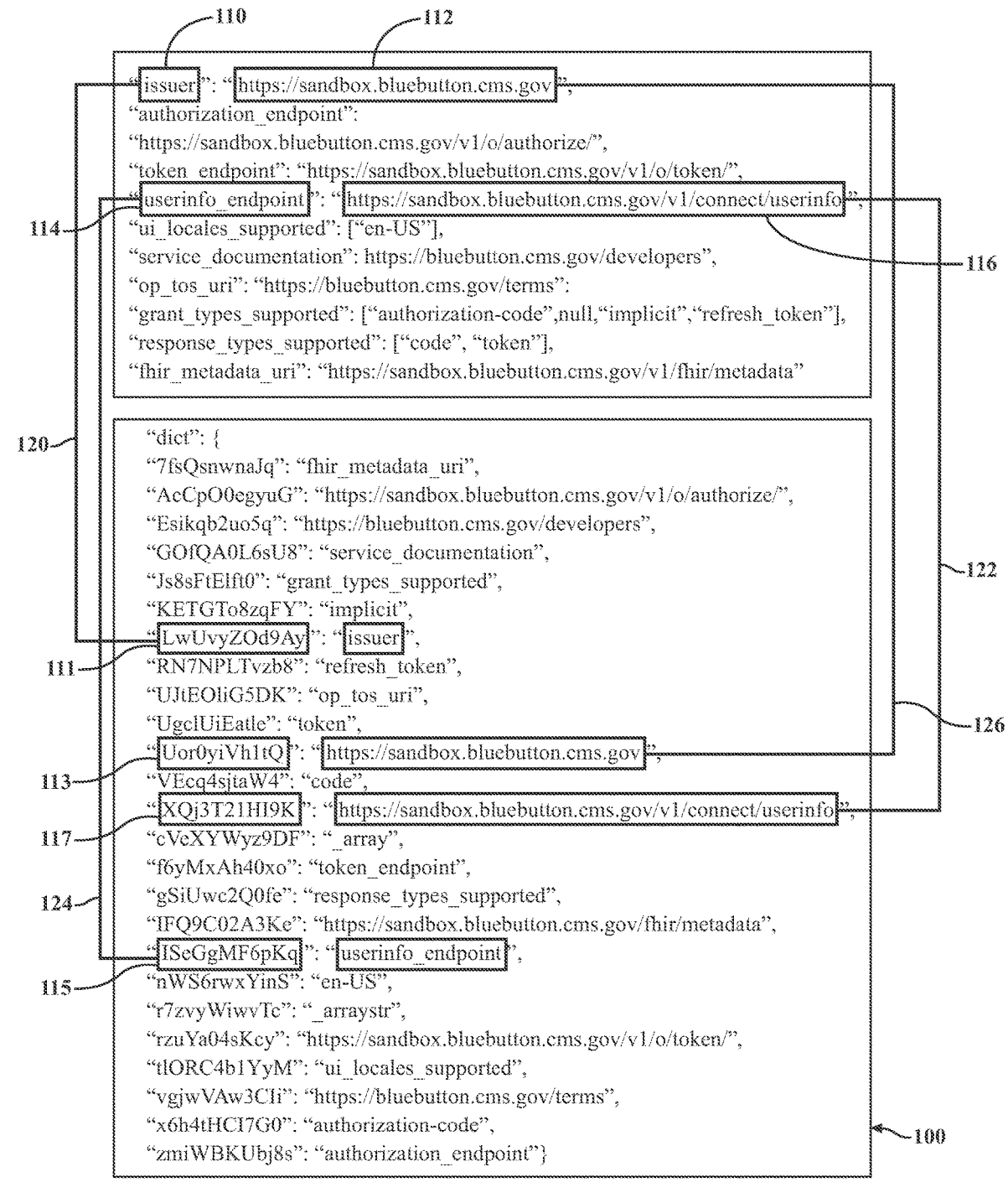
FIG. 12 is an example source document showing hypothetical assignments of hashed keys and values.
Figure 13:
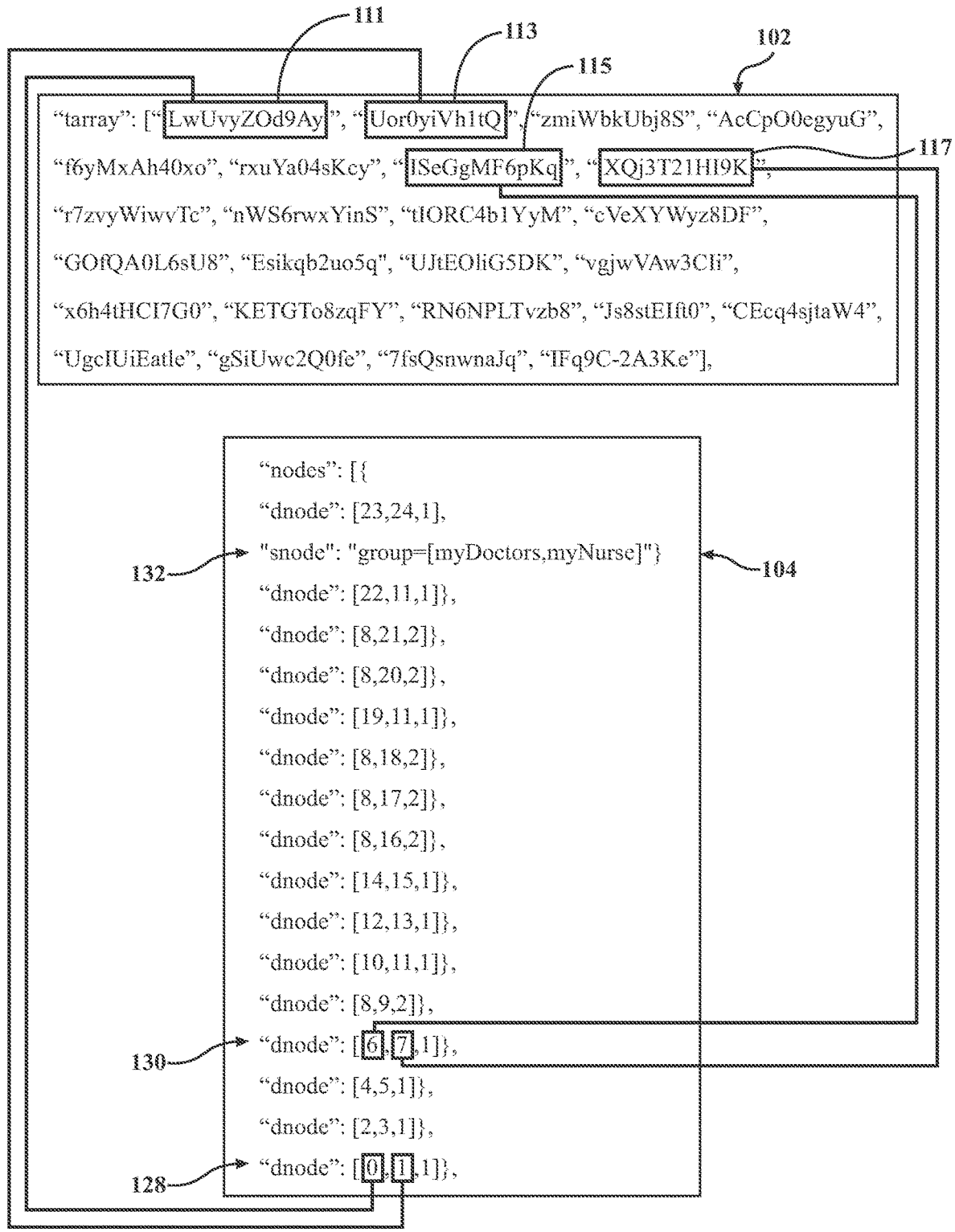
FIG. 13 is the same example as FIG. 12, showing a t-array of the hashed keys and values, and a plurality of nodes.

Preliminarily, the term "document" as used in this specification and the claims means "data." Unless the context specifically requires a contrary construction, "document" means both static data values (e.g., lastname=jones, birthdate=06/30/1994, current_temp=188° C.) and data that is used as a resource by a component of database system 10, such as executable code, call routines, or calls for a microservice orchestrator, such as Kubernetes. In a preferred embodiment, documents (data) are parsed into a "Common Hierarchical Format" (CHF). CHF is a format that comprises keys and associated values, and that is expressible as a flattened hierarchy. For example, assume a key is associated with an array, and the array has a plurality of values (e.g. "grade1students": ["sally, "dick", "jane"]. The array [ ] is the parent value and its members children, or child values. This hierarchy may be expressed as a hierarchically ordered array of nodes, the nodes comprising tags and values found in a document, as discussed further below. An example of data parsed into CHF is illustrated in the top box of FIG. 12, showing keys and values, e.g. "issuer" (the key (or tag)) and "https://sandbox.bluebutton.cms.gov" (the value associated with the "issuer" key). As described further below, a CHF document holds data in a form that is easily queried and allows for query output into various other document formats. In one embodiment, the CHF data is formatted as Javascript Object Notation (JSON) as shown in FIG. 12. FIG. 13 shows a plurality of nodes 104 expressing the hierarchical features of the CHF data from FIG. 12. Other formatting can be used depending on use case, such as XML, YAML, or binary representation. In one embodiment, the parser is of stream type. In a preferred embodiment, the parser maintains the natural key—natural value associations. Again, it bears emphasis that "document" and "data" as used herein covers both static key/values, as well as data comprising a trigger or computer instructions directed internally to any component of database system 10, or an instruction directed externally.

Figure 4:
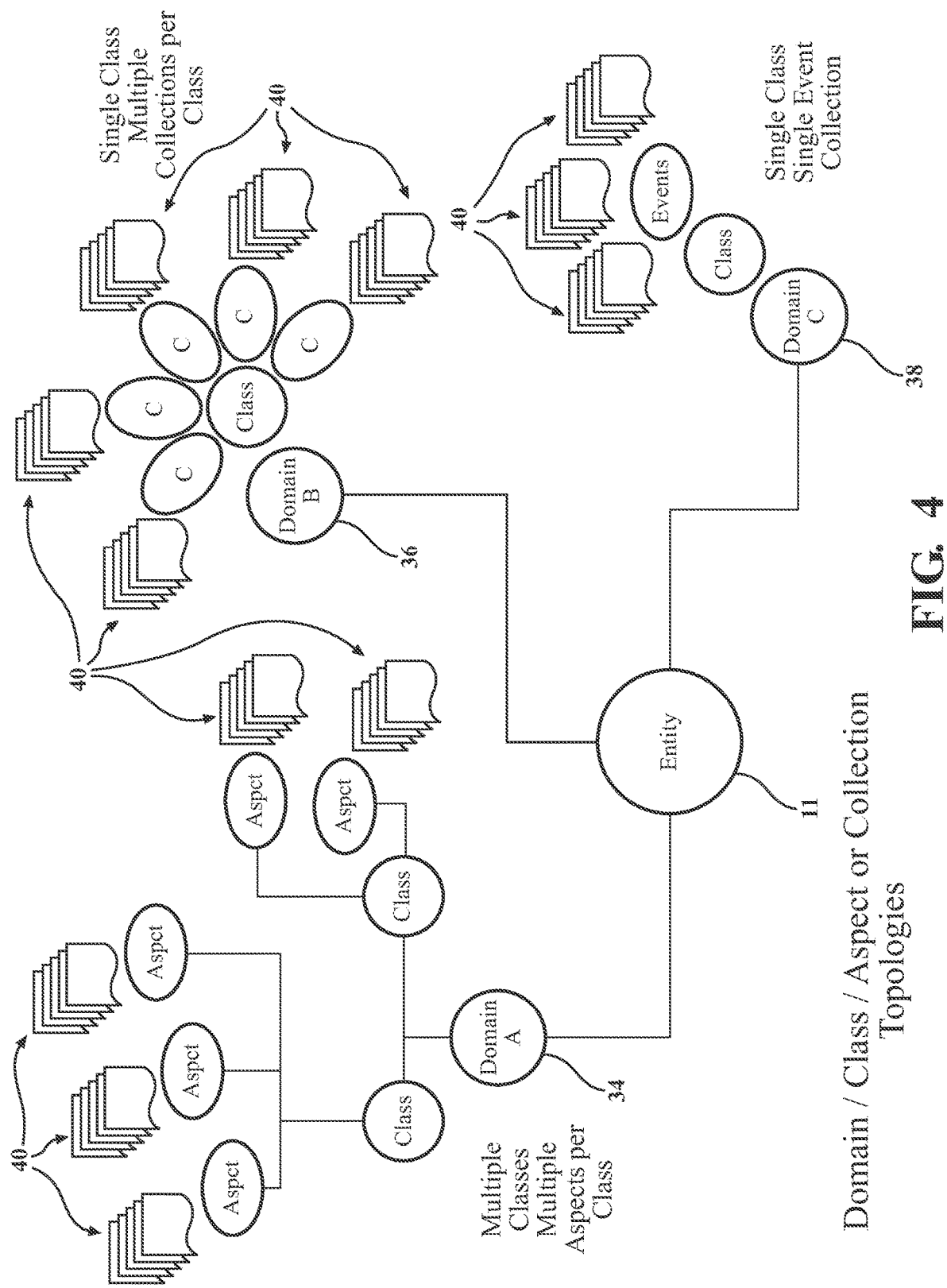
FIG. 4 shows some examples of data custodian topologies.

FIG. 4 shows entity 11 having a plurality documents 40 pertaining to it, classifiable in three domains—domain A (34) domain B (36) and domain C (38). Domain A is comprised of two classes, a first class having three aspects and a second class having two aspects. Each of the five aspects is comprised of one or more documents. Domain B is comprised of one class but many collections "C" within that class, with each collection comprising one or more documents. Domain C is comprised of a single class with a single "event" collection, with the event collection having a plurality of documents. These three examples are of course only illustrative and not limiting. An entity might belong to any number of domains, a domain might have any number of classes, and a class might have any number of aspects, or collections. Further, although FIG. 4 illustrates three top-level components (Domains A, B and C) each having three subcomponents, an entity might have fewer than three or more than three subcomponents nested under a given domain depending on the entity's preferences.

Figure 5:
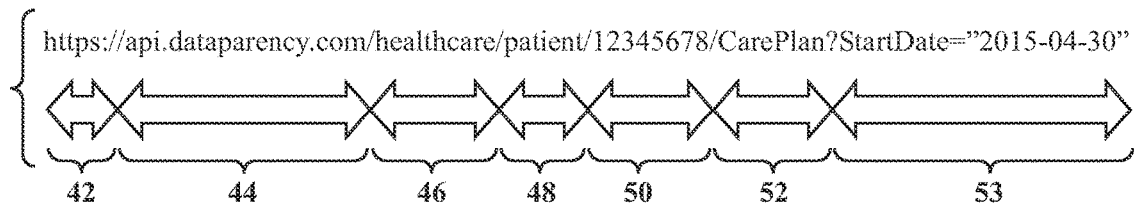
FIG. 5 is an exemplar URI request with parameter.

In a preferred embodiment, the platform receives requests (both GET and POST) for documents (including resources) using a uniform resource indicator (URI) familiar to all as the protocol of the World Wide Web (WWW). Referring to FIG. 5, an exemplar URI is constructed in multiple parts comprising the https (or http) protocol 42 (https://), the service access endpoint and port 44 (api.dataparency.com), the domain name 46 (healthcare), the entity type name 48 (patient), the RDID access token 50 (12345678), the aspect name 52 (CarePlan), and any query qualifiers 53 (?StartDate="2015-04-30"). Data queries can thus be a simple "path" definition in the API call. As discussed below, the RDID access token 50 can be empty for queries across all access-allowed entities within the domain and aspect. (This functionality is similar to the 'SELECT *' command in standard query language SQL.)

Additional options to the POST request, for example, allow for removal of data when a time period has passed by specifying an "expiry" query qualifier (e.g., "?expiry=60" [deleted after 60 seconds]) or whether to allow entity-wide queries (e.g. "?entityAccess=private"). The expiration feature may be used to implement a "locking" protocol by POSTing a lock document with an expiration, for example 10 seconds, and interrogating this document to check for locking status. When the lock document expires and is removed, further processing may proceed.

Platform Security

Database system 10 is secured at multiple levels. To begin, access to data platform 12 is generally, but not exclusively, by the web protocol HTTPS. HTTPS is a common network protocol which provides secure transport of data within the internet through Transport Layer Security (TLS) protocols expressed in various standards. All interaction with the platform is secured by HTTPS transport or other auxiliary methods of secure transport.

Moreover, all data is preferably transferred between the components of the platform encrypted, both in transport and at rest. In one embodiment, data platform comprises a computer server that receives an encryption key pair comprising a server public encryption key and a server private encryption key. In a preferred embodiment, the server encryption key pair comprises an elliptic-curve cryptography (ECC) server encryption key pair. The server ECC key pair may be modeled, for example, on Curve25519, AES-CBC-256, and HMAC-SHA-256.

In addition to the server encryption key pair, each entity registered on data platform 12 also is assigned an entity key pair comprising an entity public key and an entity private key. In one embodiment, data is encrypted/decrypted by the unique public/private key pair created when the entity was first registered. This private key pair is not known outside of platform 12 and therefore enhances the security of data within the platform.

In one embodiment data platform 12 receives data to be posted in encrypted form, the encryption arising from the entity's use of a unique key from a key pair that was passed at entity registration and stored in the entity system profile. In one embodiment, data platform 12 may decrypt documents 40 it receives prior to parsing and storing them as described below. Decryption may be accomplished by using the entity's key pair.

In a preferred embodiment, data is hashed to increase security. The data to be hashed includes data that is on the platform, as well as internal values generated by the platform, such as entity distributed identifiers (EDIDs) and relationship distributed identifiers (RDIDs). The hashing may occur using any method known to those skilled in the art. Hashes, including icons generated according to the process discussed below, are unidirectional (one-way). Neither hashes nor icons can be "decoded" to ascertain the original data.

In one embodiment, data to be posted are iconized using an icon generator (IG), which in one embodiment uses a linear algebraic coding scheme. Generating an icon may employ the teachings of Direen, U.S. Pat. No. 6,493,813 "Method for Forming a Hashing Code" which is hereby incorporated by reference in its entirety. The IG may comprise a linear feedback shift register implemented with tables to maximize performance. The IG may produce icons having a fixed width which in one embodiment is 64 bits. The IG may utilize chaotic distribution and produce alphanumeric icons that are evenly distributed over the range of values the icon width can represent regardless of the length of the input data or the pathology it possesses. In one embodiment, the IG ensures that blocks of sequential input values are widely distributed across the icon field. In another embodiment, the IG produces a perfect transform, so that if every possible 64-bit value is transformed (iconized), the resulting icons will likewise be transformed to every possible 64-bit value—only in a different order. No two inputs will produce the same icon value if the inputs are less than or equal to 64-bits. Longer length input data will result in an imperfect transformation, which is still useful in most all applications.

In another embodiment, the transformation is fractal. In another embodiment the transformation is extensible. The IG can be used to produce codes of more than 64 bits; longer codes can be produced piecemeal that possess the same qualities as the 64-bit code, so codes of any desired length can be produced without re-programming the IG. In another embodiment, the IG can transform variable length input data. A preferred IG processes input data one byte at a time, so the icon can be read at any time, so codes based on any input data length(s) can be produced.

An Associative Processing Unit (APU) may be connected to the IG which supports icon algebra. Icons can be processed combinatorically, producing the same result had original input data been manipulated before transformation. For example, if "Vince" is transformed, and then "Lombardi"; the two resulting icons can be combined to produce the same icon that would have been produced from "Vince-Lombardi". The preferred APU can accomplish a variety of virtual functions including: concatenation (as in the example above); removal of data from the beginning or end of input data; combination (XOR) of input data; or changing of components of input data. The primary benefit of icon algebra is that the APU accomplishes these functions quickly on short fixed-length icons in lieu of re-processing input data. The icons "stand in" for arbitrarily large blocks of input data.

Another very significant security feature of the invention is to bind unique unidirectional relationship identifiers (RDIDs) in URI POST and GET requests, to documents and to data components, as discussed above and discussed in greater detail below. Additional security is maintained by use of various identification, authorization, and authentication techniques such as JWT (JSON Web Token) or OAuth 2.0, or later, which are used to restrict access to the platform. In a preferred embodiment, access to the platform is secured by additional security measures such as a requirement to provide the entity name and entity passcode to the system before gaining access. Those skilled in the art will understand that the security measures described herein regarding access control and data encryption are merely representative and not limiting.

Operation of the Platform

Posting Data

For simplicity, assume a first entity desires to post or get one or more documents pertaining to a second entity. In order to access the system, the first entity must have registered with database system 10 and established a relationship with the second entity. The data platform 12 would first have assigned to the first entity an RDID governing that relationship. The RDID is unique for that relationship, and is unidirectional, i.e. one-way, from a requesting entity. In this example, the requestor is the first entity and the second entity is the target. The first entity knows its RDID for the relationship it has with the second entity (and for the relationship it has with any other entity with which it has a relationship).

For example, suppose first entity is a hospital and second entity a person. These two entities could have one, two, three, four, or even many more RDIDs. The platform 12 could assign a first RDID regarding a first relationship concerning those documents that pertain to the person as a patient. The hospital would use this RDID if it wanted to post or get a document pertaining to the patient. Suppose second entity happens to be a doctor. The platform 12 could assign a second RDID regarding this second relationship between the hospital and the person pertaining to her doctor role. Or suppose the same person desired to view results of a lab test performed on her blood in her role as a patient of the hospital; this would be a third relationship requiring a third RDID. Or suppose the person desired information pertaining to hospital admitting policies. This would be a fourth relationship requiring a fourth RDID. Another entity might be the group of doctors practicing in the hospital's maternity ward, of which second entity is a member, thereby indicating an assignment of yet more RDIDs covering the various combinations of relationships between the three entities.

Figure 6:
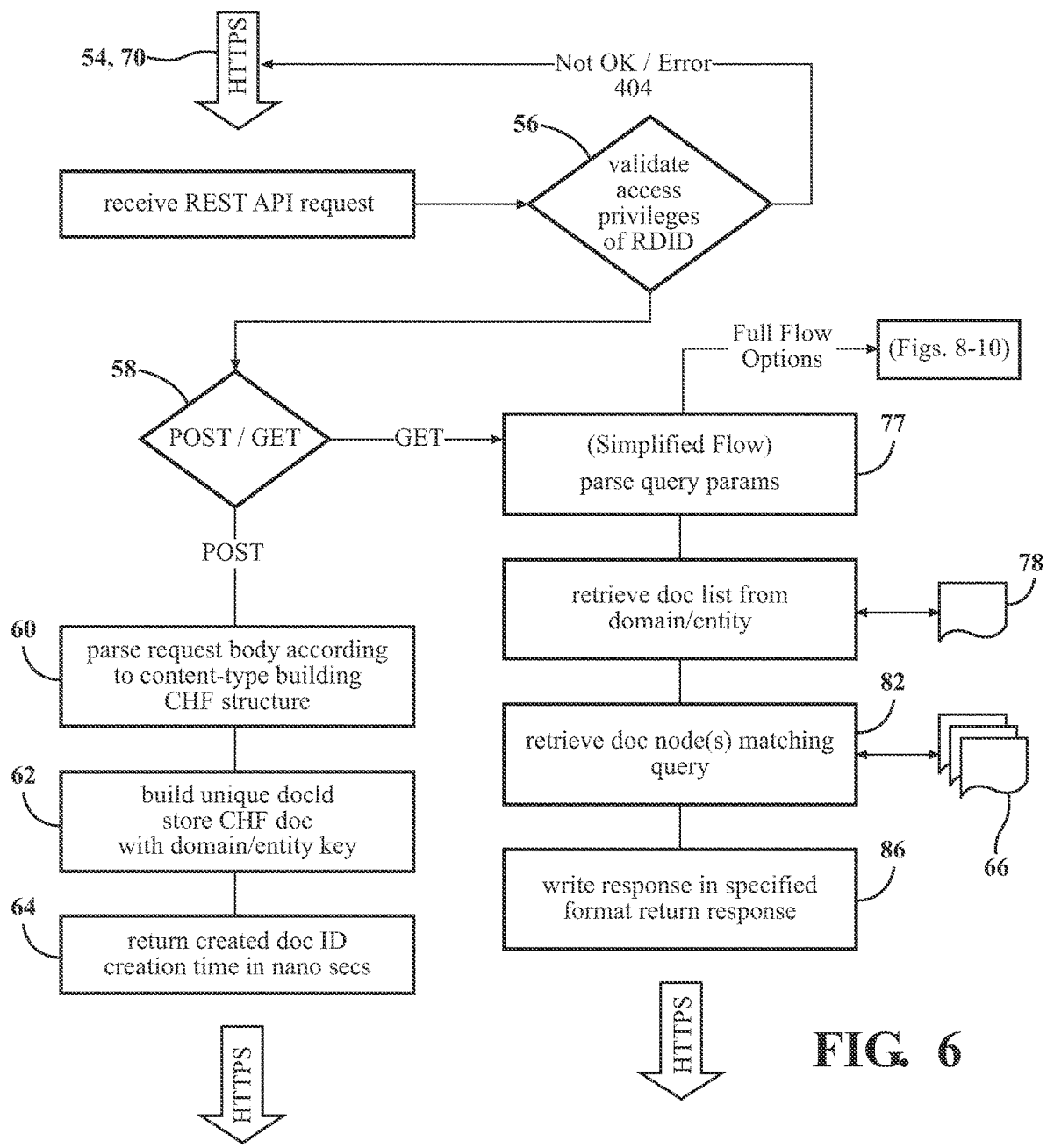
FIG. 6 is a general HTTP request flow for query (GET) and update (POST)

FIG. 6 is a simplified flow of a preferred implementation for a method of processing POST and GET commands originating from a first entity regarding documents pertaining to a second entity. A first entity submits a POST or GET command by means of an https (or http) request to data platform 12 through REST API interface 14 (a "post-URI" or "get-URI"). The POST command may be secured through a TLS protocol and/or encrypted during transport and/or encrypted while at rest. The post command may be further secured by a second authentication technique such as a second JSON Web Token with Platform-encrypted fields, and/or comprise OAuth 2.0 or higher. The second authentication technique may also comprise the entity's EDID (discussed below). In one embodiment, data platform 12 receives the post command from the API. In another embodiment, the post command is received at the platform 12 pursuant to a REST architectural style, and or received at the platform 12 via a web service. The POST request is in the form of a URI, and the URI comprises an RDID access token 50 and other components, for example the components: domain/class/RDID/collection.

As will be described, the RDID is a value used by both requestor entities and by data platform 12. In one embodiment, RDID access token 50 is derived from a longer and/or more complicated "system RDID" value used by the platform 12. In this embodiment, the "system RDID" is the value actually used by platform 12 to validate post and query requests, for example, and for mapping values as described more fully below. In a preferred embodiment, the actual system RDID is not provided to the requestor entity. Instead, RDID access token 50 is provided to the requestor entity. RDID access token 50 may be, for example, a 128 bit hash, base 62 encoded string of a longer system RDID. When the requestor entity includes RDID access token 50 in a URI, the platform 12 derives from RDID access token 50 the value of the "real" system RDID. Both represent the same RDID value, but one is encoded to be shorter and more convenient for system users.

Those skilled in the art will understand that there are a variety of ways that platform 12 may derive from RDID access token 50 the RDID value employed by the system for these processes. Unless the context dictates a different construction, references to "RDID" in the specification and the claims mean a unique and unidirectional value assigned to a relationship between two entities (recalling one entity may consist of a plurality of other entities), irrespective of whether that value is encoded or not encoded.

Before processing the post request, platform 12 evaluates the RDID component of the URI to determine whether the RDID in use is valid, i.e., whether the information passed in post-URI 54 matches the information in the RDID and whether the first entity in fact has the requisite relationship privileges to allow posting and/or querying documents pertaining to the second entity (or a plurality of entities) at step 56. In one embodiment, the validation step comprises comparing information derivable from the RDID access token 50 contained within post-URI 54 against information derivable from the second entity credentials retrieved from the data store 18. If the RDID is not validated, the request is aborted and the platform 12 returns an error. If the RDID is valid for the access privileges requested, the platform 12 goes to the next step, which may be posting a document or issuing a query via a GET request.

After validating the RDID, data platform 12 evaluates whether the request is a POST or GET command at step 58. In a preferred embodiment, REST API interface 14 responds to only two HTTP request verbs, GET (query) and POST (store). Excepting the OPTIONS verb to implement Cross-Origin Resource Sharing (CORS), all other HTTP verbs return a not found (404) return code. It is therefore impossible to delete or modify existing data thus providing an immutable database.

Turning first to the POST path, a post-URI 54 is received at data platform 12 for ingestion. (For convenience, FIG. 6 combines some aspects of processing both POST and GET commands. The HTTPS arrow at the top of FIG. 6 could be a post-URI 54 or a get-URI 70 as described below.) The ingesting may comprise first determining whether the posted document is a supported format type. If the format is supported, data platform 12 may parse the document into a plurality of data components using a parser of the format specified in the store request into a Common Hierarchal Format (CHF) at step 60. The data components may comprise natural keys associated with their natural values (as contrasted with hashed keys associated with their hashed values). The parsed data components may also comprise formatting data arising from or related to the parsing operation itself. The parsing produces CHF data, which in one embodiment is formatted as JSON. The CHF data may also be formatted in a binary representation. Referring again to FIG. 12, the top box is an example of data parsed into CHF showing keys and values, e.g. "issuer" and "https://sandbox.bluebutton.cms.gov" respectively. At or near the time the parsing occurs, the CHF data may be hashed, for example as described above using an icon generator.

At step 62, platform 12 performs several operations at or near the same time, namely, building a unique document identification (docID) for the document and storing the CHF document using one or more keys relating to the URI path, noted in FIG. 6 as "domain/entity key."

In one embodiment, platform 12 retrieves a list of entities 90 that have access to the domain/class/collection specified in the path of post-URI 54. To access the entity list 90 that lists entities having access to post-URI 54, the platform 12 may first generate an "entity list key" ("el-key") 88 to retrieve the document containing data of the entities having access to documents in the subject domain/class/collection. The el-key 88 may be derived from the post-URI path, and may correspond to an "el-URI" address in Key-Value (KV) entity store 18 that is associated with a list of entities having access to the domain/class/collection specified in the path of post-URI 54. In a preferred embodiment, the list of entities stored in the data store 18 are values and neither the el-key nor the values are human readable. In one embodiment, the el-key and the values are hashed using a 128 bit key. In another embodiment, the el-key and the values are encrypted.

The determining step may comprise using the el-key generated from post-URI 54 to retrieve entity list 90 accessible from the el-URI address, then determining whether the second entity is included in the list of entities at the el-URI address. If the second entity is not already listed, the platform 12 may add the second entity to the list of entities to which the document pertains, and store the updated entity list 90 in data store 18. If no entity list exists at the generated el-URI, then the platform 12 may create a new entity list 90 associated with that el-URI that includes the first entity, then store that new entity list 90 in data store 18.

The determining step may further comprise retrieving a list of documents having in common the domain/class/collection specified in the path of the post-URI, then generating a "document list key" (dl-key) derived from the post-URI path. Similar to the el-key, the dl-key may correspond to a dl-URI address in the data store 18 that is associated with a list of documents in the domain/class/collection specified in the post-URI path. The dl-key may be a key to the document list 78 of documents stored in the data store 18, and the document list 78 may be comprised of list of document entries composed of metadata in the subject document, plus a dictionary comprised of keys and values within the document. In a preferred embodiment, neither the keys nor the values are human readable, and the keys and the values in the dictionary are hashed. In one embodiment, the keys and value hashes are 64 bit icons.

Updating a document list 78 for a new document entry may comprise adding a document entry to the document list 78 at a position #0 and moving any existing entries down one position. The document list 78 may be encrypted. The determining step may further comprise using the dl-key generated from the post-URI to store the document list 78 accessible from the dl-URI address. If no document list 78 exists at the dl-URI, the ingesting may further comprise creating a new document list 78 associated with the dl-URI that includes the posted document entry at position #0. That document list 78 may similarly be encrypted and be stored in the data store 18 at the dl-key address.

As noted above, the parsing activity at step 60 may comprise parsing the posted document into a plurality of data components, wherein the parsed data components comprise natural keys associated with their natural values— "natural" meaning the keys:values as presented in the posted document before hashing or iconizing. (These keys should not be confused with the el-key and dl-key discussed above. As known to skilled artisans in this field, the term "key" has different meanings depending on context.) As noted above, the data components are preferably parsed into a CHF format to produce CHF data. The CHF data may be formatted as JSON or in other formats (XML, YAML, binary, etc.). In a preferred embodiment the CHF data is hashed, and in another preferred embodiment the CHF data is iconized. The iconized CHF data may comprise string values, and the iconized CHF data may have a constant width, such as 64 bits.

In a preferred embodiment the ingesting further comprises creating a dictionary 100 of the data components presented in the posted document, the dictionary 100 1) associating the natural keys to their corresponding hashed CHF key data, 2) associating the natural values to their corresponding hashed CHF value data, and 3) associating the formatting data to their corresponding hashed CHF data strings. Referring to FIG. 12, the top box represents a source document having ten natural keys associated with ten natural values. Dictionary 100 for this source document is depicted in the lower portion of FIG. 12 (see reference 100 in lower right corner). The first natural key 110 is associated with the first hashed key 111, shown as first key association 120. The first natural value 112 is associated with the first hashed value 113 shown as first value association 122. Similarly, the second natural key 114 is associated with the second hashed key 115 shown as second key association 124. The second natural value 116 is associated with the second hashed value 117 shown as second value association 126. Dictionary 100 thus associates the natural keys with their corresponding hashed keys, and the natural values with their corresponding hashed values. As shown in FIG. 12, the hashes may be iconized 64-bit CHF data strings.

With this in mind, the ingesting step may further comprise generating an array of the hashed keys and values (a "t-array"—an abbreviation of "tag array") that comprise the hashed CHF data components. The t-array may be built in the order the CHF data components are received from the parser. Referring to FIG. 13, the first natural key 110 is associated with the first hashed key 111, which appears at the "zero" position in t-array 102. The first natural value 112 is associated with the first hashed value 113 which appears at the "first" position of t-array 102. Similarly, the second natural key 114 is associated with the second hashed key 115 which appears at the sixth position of t-array 102, and the second natural value 116 is associated with the second hashed value 117 which appears at the seventh position in t-array 102. T-array 102 may also comprise hashes of internal array navigation instructions.

T-array 102 may be indexed using a plurality of data nodes 104. In one embodiment, the plurality of nodes 104 comprises data nodes ("dnodes"). In a preferred embodiment, each dnode relates to one key and at least one value associated to that key. A key (e.g. "middle name") might have no value associated with it. As used in the specification and the claims, "associated value" includes an empty set, a "null value" or "no value".

As shown in FIG. 13, plurality of nodes 104 comprises first dnode 128 indicating that the hashes at positions 0 and 1 in t-array 102 have a key:value relationship. (The last position in the node indicates the dnode parent index in the dnodes, which may be used to reconstruct the hierarchy of the original posted document.) Similarly, dnode 130 indicates that the hashed values at position 6 and position 7 have a key:value relationship in t-array 102. Plurality of nodes 104 may further comprise one or more security nodes 132 ("snodes") that comprise internal instructions that restrict access to some or all entities of the t-array nodes or restrict permissible query parameters by other entities. In the example shown, snode 132 might limit access of one or more nodes of these CHF data components to the access groups "myDoctors" and "myNurse". In sum, plurality of nodes 104 comprise nodes that point to at least two hashed CHF data strings in the t-array that have a key:value association, the associations corresponding to the associations between the natural keys and the natural values.

Figure 7:
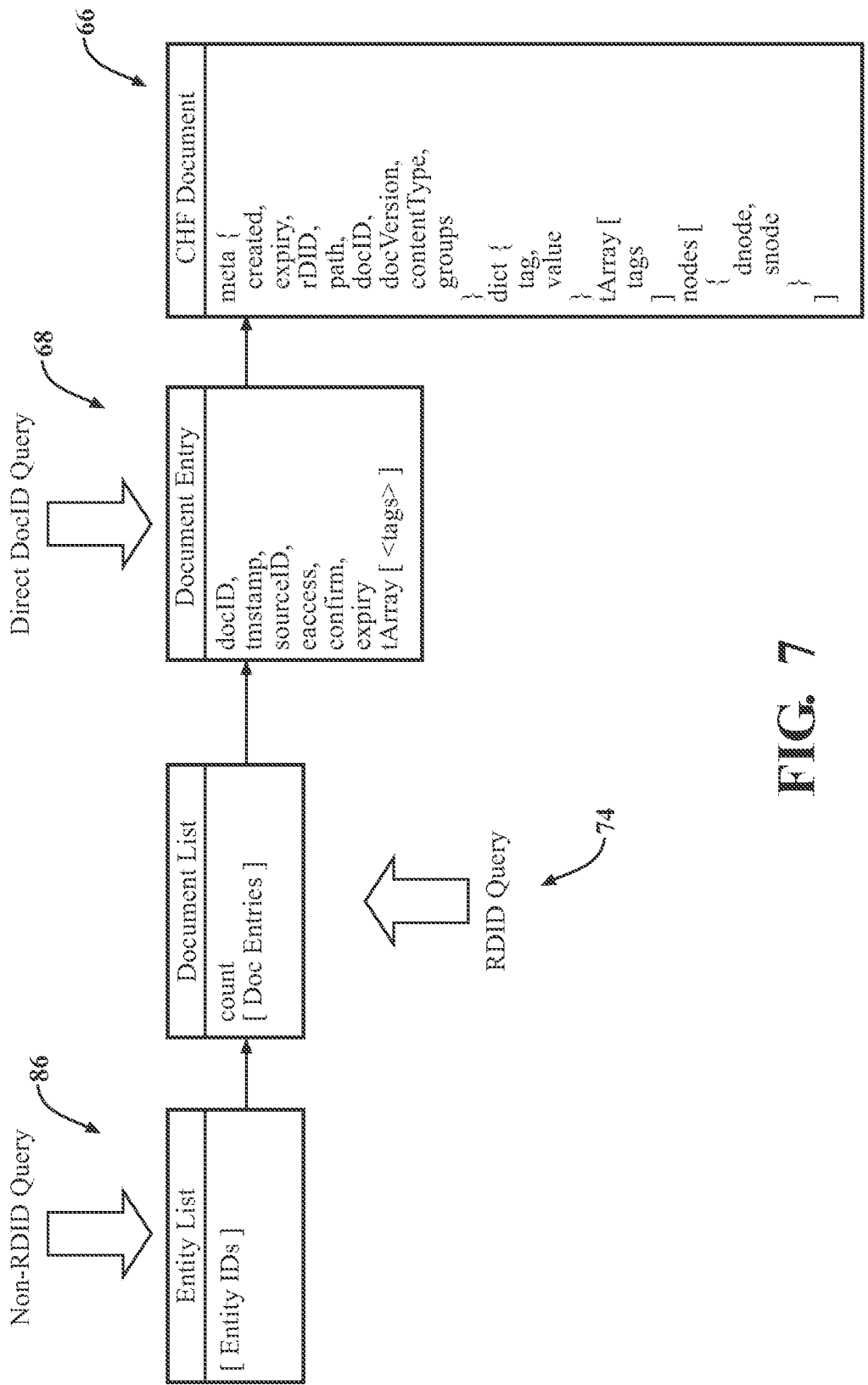
FIG. 7 is a representation of process flow for navigating data queries using the system and CHF data documents.

The ingesting step may further comprise generating a meta header based on the CHF data parsed from the posted document. In one embodiment, the meta header may comprise key-value (KV) information regarding the hierarchical post-URI, including a hash or icon of the individual components of the post-URI path. The meta header may also comprise KV information concerning the time the CHF document was created. In one embodiment, the time of creation is measured in UNIX Epoch nanoseconds. In a preferred embodiment, the meta header comprises KV information concerning the RDID in the post-URI path. The meta header preferably further comprises KV information concerning a document ID (DocID) that uniquely identifies the posted document. The meta header may also comprise KV information concerning a document version; KV information concerning content type; and KV information regarding groups permitted to access the posted document. The meta header may further comprise an expiry date, including an expiry date expressed as a time duration, in nanoseconds, after which the CHF data will be considered expired and will be removed from the data store 18. As shown in FIG. 7, the CHF document 66 (as distinguished from the "posted document") may thus comprise the meta header with each of its components (creation date, RDID, docID, etc.), the dictionary, the t-array, and the plurality of data nodes.

The ingesting step may also comprise encrypting the parsed CHF data from the posted document. In one embodiment, the encrypting comprises using the first entity public key. In another embodiment, the encrypting comprises encrypting the meta header using the server public encryption key such that the encrypted header is retrievable only by the platform 12. In another embodiment, the encrypted meta header is used to add a transaction to a DLT ledger. The added transaction may be utilized to record a consensus. The added transaction may be used to retrieve CHF document 66. In another embodiment, the added transaction reveals no private data to the ledger.

Data platform 12 may then complete the ingesting process and store the CHF document in data store 18. Data platform 12 may discard the posted document underlying the CHF document or archive it, preferably beyond the reach of the network. Each data store 18 in the set contains the data from one to many entities assigned to it. Data store routing may be determined by a private entity key as retrieved from the RDID. If document list 78 was revised as described above, the revised document list 78 is stored in the data store 18 at the dl-URI address. If a new CHF document is created, in one embodiment a document entry is added to the new document list 78 at a position #0 and any existing entries may be moved down one position. As noted previously, all or some of the CHF document may be stored as iconized CHF data, wherein the CHF data comprises string values. Consistent with the discussion above, the iconized data may have a constant width and the icon width may be 64 bits.

The document list 78 associated with the dl-URI for the posted document is then preferably revised to add a subset of information from the CHF document. The subset of information added may comprise the docID, a timestamp, a sourceID corresponding to the first entity which posted the document. The subset of information may further comprise an accessibility field, wherein values for the accessibility field comprise "public" and "private" indicating how broadly the second entity allows the data in the CHF document to be queried. The subset may further comprise an expiry date and the t-array. Consistent with the emphasis on security discussed repeatedly above, in one embodiment document list 78 itself is encrypted by the server public encryption key using techniques discussed above.

The ingesting may further comprise replicating the CHF document and storing replicated CHF data in at least one data store 18; wherein the replicated data is stored in a plurality of data stores 18. In another embodiment, the ingesting may comprise storing the CHF data in a database determined by sharding, on entity, some or all of the CHF data components parsed from the posted document. The ingesting step may further comprise directing storage, by entity, to "serverless" functions bound to entity data in a serverless platform. An example of a serverless platform is AWS Lambda. The ingesting may further comprise assigning the CHF data parsed from the posted document to one or more of the plurality of databases, wherein a plurality of the one or more databases comprises a distributed ledger technology (DLT) ledger. Some or all of a particular data store location(s) 18 may be mirrored at an external backup site, which similarly might comprise a distributed data store of a DLT ledger. A data store and/or an external backup site may be a distributed store, and may be a distributed block data store.

Figure 11:
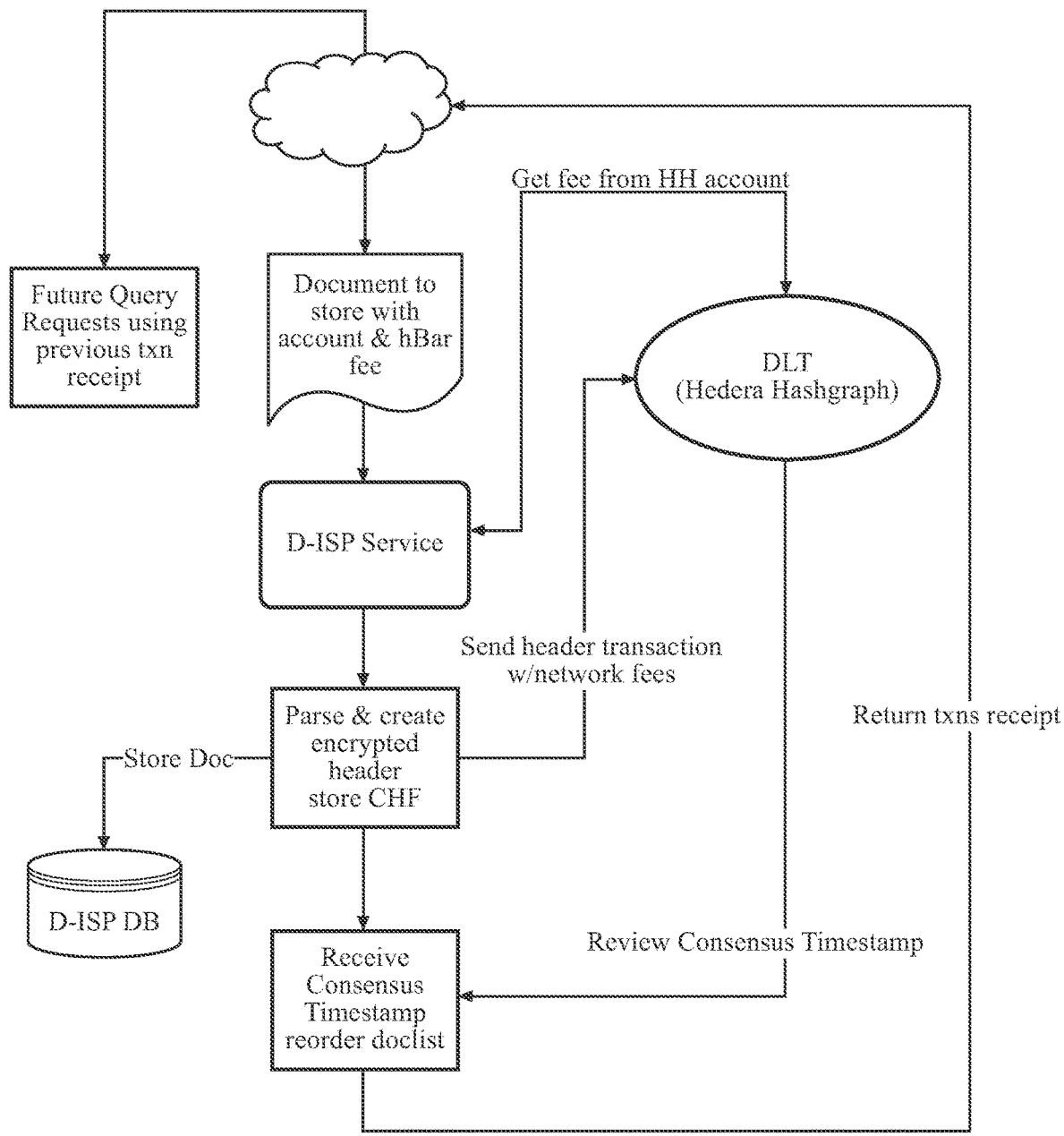
FIG. 11 is an example of Distributed Ledger Technology integration with the platform.

The parsed CHF data and/or some or all of the CHF document can be transmitted through network protocols to one or more receivers connected to the network for processing and/or persistence at multiple network nodes. As such, the CHF can be used as a memory-only representation and may be queried in the way persisted CHFs are. Optionally, the meta header returned from a POST operation can be returned encrypted by the server private encryption key and therefore retrievable only by data platform 12. The encrypted meta header can be used to post a document transaction to a DLT ledger for purposes of consensus without the posting revealing private data to the ledger, as shown in FIG. 11, showing features and applications that will be understood by those skilled in the art of distributed ledger technology. As noted, the meta header may comprise information regarding the post URI path, the time of storage. It may also comprise a hash of the ingested posted document, and other information as may be required. The meta header information may be stored in specially formatted CHF documents, including CHF documents encrypted by the server public encryption key, for validation.

Returning to FIG. 6, step 64 may return information to the first entity which posted the document, including parts of information contained in the meta header such as whether the posting and creation operation was successful, the creation time, the docID which was created during ingestion, and/or the docVersion. The CHF document is immutably associated with the first entity and the domain and sublevel components specified in post-URI 54.

Querying Data

FIG. 6 shows the general steps relating to a first entity's query for information pertaining to a second entity that is stored in database system 10. In the embodiment shown, the same validation steps 56 discussed above for a POST command apply to validating the query, specifically validating access privileges by reference to the RDID component of the URI to determine whether the RDID is valid.

FIG. 7 illustrates an embodiment in which platform 12 processes at least three categories of queries issued by a first entity (requestor) regarding documents pertaining to a second entity (target): a direct docID query requesting data from a specific document; an RDID query across collections of documents that are accessible to the first entity based on one unique relationship with the second entity; and a non-RDID query concerning documents pertaining to many entities that may or may not be governed by a specific RDID between those entities and the first entity.

DocID Query

Queries are received at data platform 12 via a HTTP(S) GET command. Referring to FIGS. 6 and 7, a first entity may issue a direct DocID query 68 to obtain access to a desired CHF document pertaining to the second entity. The desired CHF document may comprise static data or computer instructions or any kind of data. Similar to the process for posting a document, the query may in the form of an HTTP-formatted GET command received at data platform 12 via HTTPS protocol in URI format. Like the POST command discussed above, the GET command may be secured, for example through a TLS protocol, and may be encrypted during transport and/or encrypted while at rest. Like a post command, the query command may be secured by a second authentication technique, for example a second JSON Web Token with platform encrypted fields. Authentication techniques may comprises OAuth 2.0 or higher, and may comprise layered authentication techniques, such as authentication based on the first entity's Entity Distributed Identifier (discussed further below) and/or the RDID access token 50 and/or its derivative being used in the query.

In one embodiment, a server connected to data platform 12 receives a request to retrieve data from an API interface, which may be a REST API interface. The retrieval request may be formatted as a get command using HTTPS protocol, and is preferably structured as a URI using domain-driven hierarchical format. This get-URI 70 may be received at platform 12 pursuant to a REST architectural style and the get-URI 70 for the desired document may comprise a hierarchical path. As shown in the example illustrated in FIG. 8, the hierarchical path in get-URI 70 may comprise a host:port, domain, a class, an entity-type, an RDID, a category, an aspect, and/or a collection. In the direct Doc ID query, the get-URI request comprises the DocID discussed above. Some or all of the domain and sub-level components of the get-URI may be hashed or iconized. In a preferred embodiment, the DocID is not hashed or iconized.

After validating the first entity's request for access to documents pertaining to the second entity as discussed above, data platform 12 performs a hashing operation or generates an icon on the submitted query parameters using the same formula used to hash documents when posted, as discussed above. The resulting hashes (or icons) of the query are thus in the same "language" as the keys and values stored in the CHF documents 66.

Figure 8:
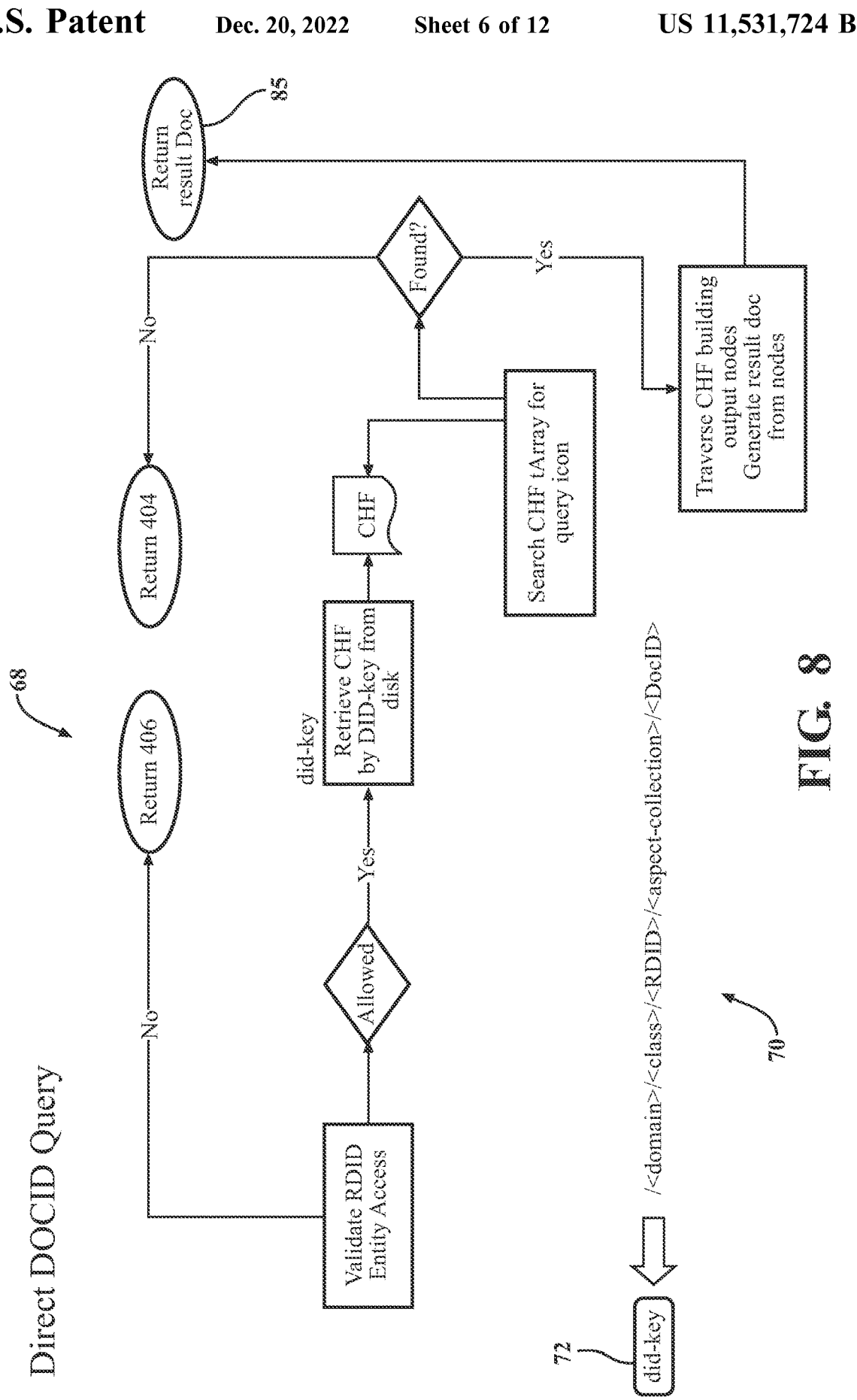
FIG. 8 is the process flow of a Direct DocID query.

Referring to FIG. 8, in one embodiment the platform 12 derives from get-URI 70 path a "document identifier key" (did-key) 72. The did-key 72 is derived from the get-URI address 70 to ascertain the path to the specific CHF document 66 stored in data store 18. The platform 12 may then use did-key 72 to retrieve from the data store 18 the CHF data associated with the desired CHF document 66.

A direct DocID 68 query may comprise searching the CHF data t-array 102 for a value restricting access to the first entity, or restricting parameters of the first entity's query. Assuming access is allowed, then using the hashed key or hashed value for the first entity's query generated at the parsing step just discussed, the platform 12 may search t-array 102 looking for a matching hash or icon, then if found traverse the accompanying plurality of nodes 104 to assemble CHF results that match the query. The retrieving step may further comprise collecting query results from the matching CHF nodes, constructing natural keys and values using the dictionary affiliated with the CHF document 66, and building output nodes in a desired format. The retrieving step may further comprise returning the results in the desired format to the first entity.

RDID Query

Figure 9:
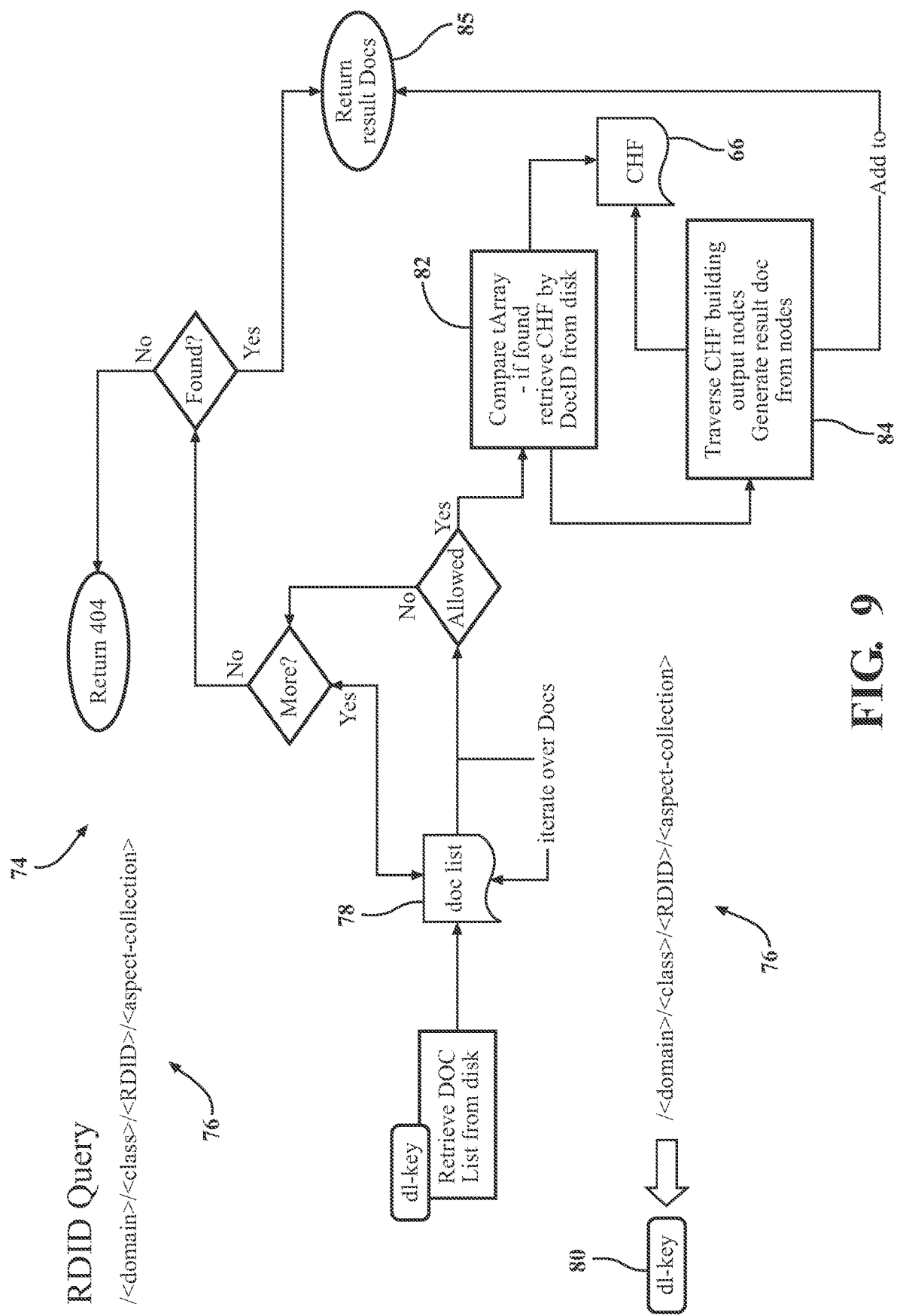
FIG. 9 is the process flow of a query limited to one RDID.

Referring to FIG. 6 and FIG. 9, a first entity having a relationship with a second entity may query a plurality of documents pertaining to that second entity to which the first entity has access by an "RDID query" 74. Similar to the direct DocID query discussed above, platform 12 receives an RDID query from the first entity requesting access to documents pertaining to the second entity in the form of an HTTPS (or HTTP) GET command and a hierarchical "query-URI" 76. In one embodiment, query-URI 76 comprises a domain, a class, and an RDID. In other embodiments, the query-URI may comprise entity-type, a category, an aspect, and a collection, or a combination of some or all of the foregoing. The query may comprise one or more desired keys (i.e., "tags"), and/or one or more desired values, or a combination of a desired keys and desired values. The query terms may be parsed at step 77 as shown in FIG. 6. Similar to the Direct docID query 68, data platform 12 may perform a hashing operation or generate an icon on the submitted query parameters using the same formula used to hash CHF data components when the documents were posted. The resulting hashes (or icons) of the query parameters are thus in the same "language" as the keys and values stored in the CHF documents 66.

Upon receiving RDID query 74, data platform 12 retrieves a document list 78 pertaining to the indicated domain and/or entity. Document list 78 is a listing of all documents accessible to the first entity as indicated by the RDID that may have CHF data that satisfy the query parameters. In one embodiment, when platform 12 receives query-URI 76, it generates a "document list key" (dl-key) 80 derived from the path of query-URI 76. This dl-key preferably comprises a dl-URI address in data store 18 that is associated with a list of documents (document list 78) in the domain/class/collection specified in the path of query-URI 76. The dl-key 80 may be derived from the path of query-URI 76, for example, by hashing or combining hashes of its domain plus a hash of the class comprising query-URI 76, and may be a fixed width 128 bit icon. The address reached by dl-key 80 may comprise a listing of one or more documents in the data store 18 that are responsive to RDID query 74. In sum, data platform 12 may use dl-key 80 to generate from query-URI 76 a document list 78 accessible from the dl-URI address. Document list 78 stored in data store 18 comprises data with keys and values, and may comprise the meta header, t-array and dictionary as discussed above. In one embodiment, the keys and the values are hashed and not human readable. In another embodiment dl-key 80 is 128 bit. In another embodiment, the key and the values are encrypted.

A further step in the RDID query 74 is to determine whether a first document on document list 78 permits the query by the first party, i.e., whether the first entity has permission for the query posed. This permission check is repeated for each document on document list 78 to determine whether the listed document is accessible to the first entity's RDID query 76. For each document accessible to the first entity's query, at step 82 the platform 12 compares the queried keys and/or values (in their hashed version) to the keys and values contained in the t-array accompanying each accessible document on document list 78. In the embodiment shown, if the queried key and/or queried value is in the t-array, the platform 12 traverses the indexed nodes to determine matches and index location at step 84, then assembles a complete response to the query using the responsive CHF document(s) 66, then and returns the result document to the first entity in step 85 to complete the query response.

Non-RDID Query

At times a first entity may desire to query across a plurality of entities, perhaps including some for which it has a relationship, and perhaps for some with which it has no relationship. Or perhaps the first entity has relationships with all of the parties but prefers to run the query once rather than repeating it many times for the individual RDIDs. Such a query is a non-RDID query 86. As shown in FIG. 7, non-RDID query 86 comprises many of the same principles, and some steps and features, as RDID query 74 and Direct DocID query 68. A non-RDID query 86 is more complicated than the queries discussed above because the query may reach entities which have no registered relationship with the second entity. Yet these entities having no registered relationship may nevertheless have privacy rules that permit query by the second entity.

Figure 10:
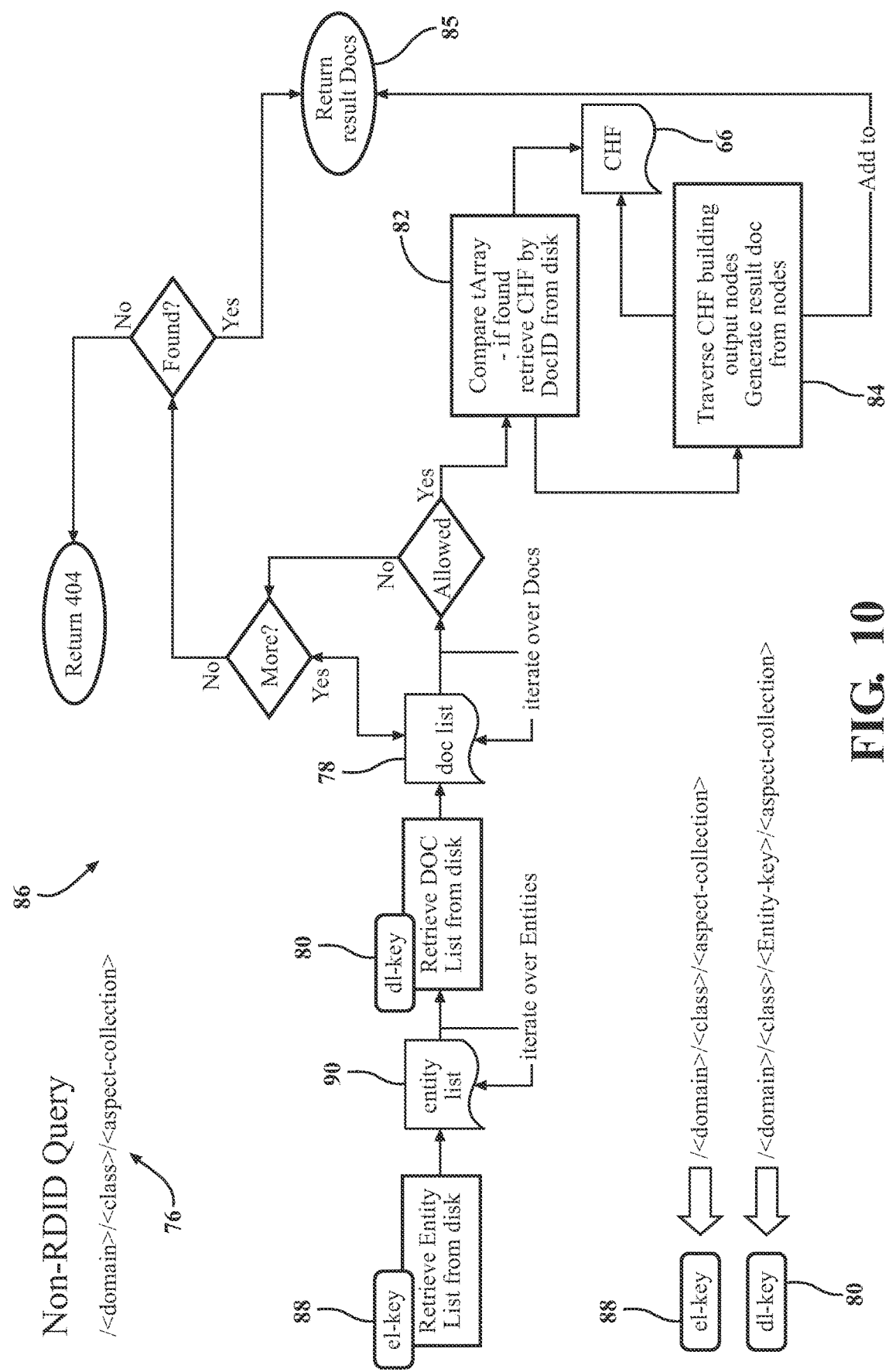
FIG. 10 is the flow of a query not confined to one RDID.

One embodiment of a solution is shown in FIG. 10. Data platform 12 receives a query from the first entity requesting access to documents pertaining to any number of entities. The query may comprise an HTTPS GET command and a hierarchical query-URI 76. Query-URI 76 may comprise a domain, a class, an entity-type, an aspect, a collection, a category, and any combination of some or all of the foregoing. In other embodiments query-URI 76 may comprise one or more desired keys, and/or one or more desired values, or may comprise a combination of a desired tags and desired values. In the embodiment shown in FIG. 10, query-URI 76 does not include an RDID component. As in the RDID query, the query terms may be parsed at step 77, and data platform 12 may perform a hashing operation or generate an icon on the submitted query parameters using the same formula used to hash CHF data components when the documents were posted. The resulting hashes (or icons) of the query parameters are thus in the same "language" as the keys and values stored in the CHF documents 66.

The platform 12 generates an "entity list key" (el-key) 88 derived from the path of query-URI 76, wherein el-key 88 corresponds to an el-URI address in the data store 18 that is associated with a list of entities having access to the domain/class/collection specified in the query-URI 76. El-key 88 may be a hash or icon derived from components in query-URI 76, such as class and collection. El-key 88 is a key to a list of entities 90 which is stored in data store 18, comprising entities that have CHF documents 66 that fall within the path of query-URI 76 and that are stored in data store 18. In a preferred embodiment, neither the keys nor the values in entity list 90 are human readable. In another embodiment, the keys and the values in entity list 90 are hashed. The hashes may be 128 bit. The keys and the values of entity list 90 may also be encrypted.

In a next step, data platform 12 may retrieve entity list 90 using the el-key 88 derived from the domain/class/collection specified in the path of query-URI 76. Platform 12 may then derive, from the values stored on entity list 90, each listed entity's internal entity key which is stored with the entity list 90. For each internal entity key, platform 12 may then generate a document-key (dl-key) 80 for each entity on entity list 90 by combining a derivation of each entity's internal entity key with the query-URI path. This results in one dl-key 80 for each entity corresponds to a dl-URI address in the data store 18 that is associated with a list of documents in the domain/class/entity-type/collection specified in the post-URI path. In other words, there will be a different dl-key 80 generated for every entity on entity list 90. For each entity on entity list 90, a dl-key 80 will be created in order to retrieve a document list 78 satisfying the non-RDID URI 86. As before, el-keys 88 and dl-keys 80 may be 128 bit.

Using the dl-keys 80, the platform 12 may access one or more document lists 78 for each entity. The document lists 78 stored in data store 18 are comprised of keys and values. In a preferred embodiment neither the keys nor the values are human readable, but rather hashed. In another embodiment, the keys and the values are 128 bit. In another embodiment, the keys and the values are encrypted. The combination of all the documents on document lists 78 retrieved using this process may comprise a candidate document list.

In one embodiment, the candidate document list comprises the subset of CHF information explained in the posting section above. For each CHF document 66 listed in the document lists 78; each candidate may comprises that CHF document's docID, its timestamp, its sourceID, its accessibility, its expiry date, and its t-array.

The remaining non-RDID query 86 steps are then similar to the RDID query 74 steps discussed above. Briefly, in one embodiment data platform 12 determines, by consulting the candidate document lists 78, whether a first candidate document permits query by the first entity. This step is repeated for each candidate document to determine whether each document on the candidate document lists is accessible to the first entity's query. Using hashed query terms (hashed using a process identical to the process used to hash information parsed from posted documents) at step platform 12 compares the queried keys and/or values (in their hashed version) to the keys and values contained in the t-array accompanying each accessible document appearing on document lists 78. In the embodiment shown in FIG. 10, if the queried key and/or queried value is in the t-array, the platform 12 traverses the indexed nodes to determine matches and index location at step 84, then assembles a complete response to the query using the responsive CHF document(s) 66, then and returns the result document to the first entity in step 85 to complete the non-RDID query response.

In the embodiment described, platform 12 is thus schema-agnostic. There is no "a priori" data index definition required to execute queries.

Registering on the Platform; Generating EDIDs and RDIDs

The above discussion has detailed an entity-centric, domain-partitionable, custodian-controlled data platform 12. In the above embodiments, posting, query and retrieval of a data is bound to unique, unidirectional (one-way) Relationship Distributed Identifiers (RDIDs) that are generated by the database system 10. Data stored in the system is not concentrated in relational database tables comprising rows and tables, but is extremely dispersed because all data is bound to many unique RDIDs.

As discussed earlier, one or more servers comprising database system 10 may receive a server public encryption key and a server private encryption key. In one embodiment, data platform 12 may generate a system secret icon based at least partly on the server public encryption key. It is a secret icon having a value known only to the system.

Access to platform 12 requires pre-registration and proper credentials. To register a first entity, the platform 12 receives a request to enroll in the platform. The entity provides identity information, such as entity name and email address, as well as a passcode provided to the entity to allow it to register. In one embodiment, after validating the passcode, platform 12 generates a private passCode for the entity and provides the private passCode to the entity. In one embodiment, the passcode is immutable and cannot be changed except by the system administrator.

Platform 12 generates an Entity Distributed Identifier (EDID) for the entity. The EDID generation step may comprises a series of steps to make it virtually impossible for any person or computer to "reverse-engineer" what entity is represented by any given EDID. The EDID generating step may for example comprise generating a first icon based at least partly on the first identity information, further comprise generating additional icons using a transform scheme such as a linear feedback shift register implemented with tables, it may further comprise algorithmically combining the first icon with a system icon, which might be the system secret icon, and may further comprise using a byte buffer to combine hashes, and may further comprise generating any number of derivative icons thereafter to serve as the EDID. In one embodiment, the EDID is a fixed width 128 bit icon, which may comprise ASCII characters. The EDID may or may not be provided to the entity depending on the application. In one embodiment, platform 12 encrypts the entity EDID using the server public encryption key then stores a unique set of entity credentials in the data store 18. Credentials used when an entity desires to access data platform 12 may be derived at least partly from the first entity EDID. In the process of registering, the entity is also provided with an encryption key pair comprising an entity public key and an entity private key. During registration, platform 12 may also record a role for the first entity, such as system administrator, domain administrator, developer, cohort, or group member. Platform 12 may record the entity's membership in a group.

In order to generate an RDID, platform 12 first receives from a first entity a request to establish a relationship with a second entity. The requested relationship may comprise relationship parameters, such as classifying the first entity as a requestor and classifying the second entity as a target. The relationship parameters may permit the first entity to post documents pertaining to the second entity and/or to query documents pertaining to the second entity. Other relationship parameters may be likewise defined, such as expiration of the relationship, as well as other access control parameters such as roles, groups, etc.

In one embodiment the RDID is based on encoding the values of the first entity and second entity. Similar to the EDID generating steps, the RDID generating steps may comprise generating a series of icons based at least partly on the first identity information, second identity information, a system icon, utilization of a byte buffer holding a plurality of two or more icons, the first entity's and/or second entity's private passcodes, and/or the system secret icon. After the platform generates the RDID, it may encrypt it, for example using the server public encryption key. Authorization to create the relationship evidenced by an RDID is derived by a series of steps following approval by the second entity. The approval may be explicit, for example, a notification and callback method whereby the second entity receives a notification from the platform of a relationship request and its desire to access certain data of the second entity at which the second entity can approve or deny, access privileges embedded in the CHF document 66 at posting. Or the approval may be implicit, for example prior authorizations given at second entity registration including, for example, prior approvals based on the role and/or group membership of the first entity. The platform issues to the first entity a RDID access token 50 which platform 12 can deconstruct when it receives it later to determine the entities and their relationship parameters. In one embodiment RDID access token 50 is a fixed length icon in base 62 having a fixed width of 128 bits, comprising ASCII characters. Platform 12 may then register the first RDID on the platform and associate the RDID with the requested relation parameters in the data store 18.

An advantage of database system 10 is that a relationship may be revoked by an entity at any time simply by deleting the subject RDID from the system. Because the data is entity-bound, there is no need to analyze where an entity's data is stored, or to move or delete innumerable files. Wherever the data is stored, it will no longer be accessible through that RDID. This capability potentially represents substantial savings, for example, to comply with the GDPR's "right to be forgotten" regulation.

Secure Remote Processing

In another aspect, the invention presents a framework by which to develop a trusted platform for extending secure applications to remote work. In one embodiment shown in FIG. 14, remote workers can safely access secure applications by combining the secure data features described above with relationship-bound transparency. Using the trusted data platform 12 and store 18 of the invention, remote users may make queries to a secure application platform interface and then receive results of the query as encrypted data responses. In one embodiment, encryption is based on the encryption Keypair assigned to the entity registered with the platform; only the remote worker, using this encryption pair, will be able to decrypt the response. In another embodiment, results are returned to a secure Golang-written webserver that, using techniques of the invention, securely exposes the result to the remote worker's browser. In another embodiment, all data is encrypted until it is received by the browser from the local secure webserver In another embodiment, all display of response data is managed with browser HTML with no Javascript involvement. This obviates or eliminates the Javascript typically used in web applications, a major weakness for secure applications. Responses (inputs) by the user are preferably encrypted with the platform's user encryption Keypair. This encrypted response may be sent by the secure web server to the application query and update interface for application processing. The application interface may comprise an ETL (Extract-Transform-Load) type call to the secure application which results in a JSON-formatted response of the application. In another embodiment, the application interface may present remote workers' queries to the application for processing rather than to the platform itself. Until this point in the processing, all data may be encrypted. Data from the application interface may be stored in the database system 10 data store 18 as a way to cache any query's results.

The foregoing invention has been described in accordance with the relevant legal standards, thus the description is exemplary rather than limiting in nature. Variations and modifications to the disclosed embodiment may become apparent to those skilled in the art and fall within the scope of the invention.

What is claimed is:

1. A method of storing documents in a database system comprising a database platform configured to send and receive data over a network, comprising:
   connecting a first entity to the platform via the network;
   receiving, at a server connected to the network, a request from the first entity to establish a relationship with a second entity;
   assigning a unique, encoded and unidirectional Relationship Distributed Identifier (RDID) that may be deconstructed by the system to identify the first entity and the second entity and the relationship parameters between the first entity and the second entity; and
   requiring the first entity to include the RDID in a Uniform Resource Indicator (URI) path in order to post a document on the platform pertaining to the second entity.

2. The method of claim 1, wherein the database platform receives the URI from the first entity via a third-party computer application.

3. The method of claim 1, further comprising ingesting a posted document at the server, wherein the ingesting comprises immutably associating data from the ingested document with the first entity and with the second entity.

4. The method of claim 3 wherein the database platform uses a cloud-based service connected to the network to perform one or more of the ingesting steps.

5. The method of claim 1, further comprising ingesting a posted document at the server, wherein the ingesting comprises parsing the posted document into a plurality of data components having a Common Hierarchical Format (CHF), the plurality of data components comprising CHF data;
generating a meta header based on the CHF data, wherein the meta header comprises Key-Value (KV) information regarding the URI path and a document ID (DocID) that uniquely identifies the posted document; and
storing the CHF data as a CHF document at one or more data stores connected to the network.

6. The method of claim 5, comprising the further step of using at least one deconstructed component of the RDID to calculate a data routing storage key.

7. The method of claim 5, wherein the URI path is hierarchical and comprises a domain and at least one sublevel component, and wherein the platform immutably associates the CHF data with the RDID, with the domain, and with the at least one sublevel component.

8. The method of claim 1, further comprising generating the RDID by hashing a combination of inputs comprising: first entity identity information and second entity identity information.

9. The method of claim 8, wherein the combination of inputs further comprises a secret system value known only to the platform.

10. The method of claim 8, wherein the hashing comprises using transform algebra operating on a plurality of inputs to generate the RDID.

11. A non-transitory computer-readable medium having stored instructions that cause one or more servers in communication with a database platform to perform the following operations:
connecting a first entity to the platform via the network;
receiving from the first entity a request to establish a relationship with a second entity;
assigning a unique and unidirectional Relationship Distributed Identifier (RDID) that may be deconstructed to identify the first entity and the second entity and the relationship parameters between the first entity and the second entity;
requiring the first entity to include the RDID in a Uniform Resource Indicator (URI) path in order to post a document on the platform pertaining to the second entity;
parsing a posted document, with a format-determined parser, into a plurality of data components having a Common Hierarchical Format (CHF), the plurality of data components comprising a CHF document;
storing, at a first data storage location connected to the network, Key-Value (KV) information regarding the path and a document ID (DocID) that uniquely identifies the CHF document; and
storing the CHF document at a second data storage location comprising one or more data stores connected to the network.

12. The computer device of claim 11 wherein the KV information stored at the first data storage location and the CHF document stored at the second data storage location are stored using one or more deconstructed components of the RDID.

13. The computer device of claim 12, wherein the CHF Document comprises: hashes of the natural keys resulting in hashed CHF key data, and hashes of the natural values resulting in hashed CHF value data.

14. The computer device of claim 13 wherein the posted document comprises natural keys and associated natural values, and wherein the CHF document comprises the KV information regarding the path and the DocID and further comprises a dictionary that associates the natural keys to their hashed CHF key data, and that associates the natural values to their hashed CHF value data.

15. The computer device of claim 11 wherein the CHF document is encrypted prior to storing.

16. The computer device of claim 11 wherein the database platform is a non-relational database.

17. A method for securely storing and retrieving document data in a database platform configured to send and receive data over a network, comprising:
ingesting a document, in response to a first URI received from a first entity, wherein the document comprises natural keys and natural values and wherein the first URI comprises a Relationship Distributed Identifier (RDID) that uniquely and unidirectionally defines a relationship between the first entity and a second entity and wherein the RDID may be deconstructed by the platform to identify the first entity and the second entity and the relationship parameters between the first entity and the second entity;
calculating a data routing storage key using at least one deconstructed component of the RDID;
parsing the document into CHF data components;
hashing the natural data components to produce hashed CHF data components; and
storing the hashed CHF data components in a data store connected to the platform via the network using the data storage routing key.

18. The method of claim 17 comprising a step, after the storing step, of receiving a query from the first entity comprising a second URI, the second URI comprising the RDID, to get some or all of the natural keys and natural values in the ingested document; and
searching the stored hashed CHF data to derive, from the hashed CHF data, results that satisfy the query.

19. The method of claim 18 wherein the searching step ignores the document and any natural copies of the document.

20. The method of claim 17 comprising a step, after the storing step, of receiving a query from the first entity comprising a second URI to get some or all of the natural keys and natural values in the ingested document wherein:
the second URI does not comprise an RDID but does comprise a hierarchical path comprising at least a domain and a class; and
searching the stored hashed CHF data to derive, from the hashed CHF data, results that satisfy the query.

* * * * *